United States Patent
Katayama et al.

(10) Patent No.: US 8,436,954 B2
(45) Date of Patent: May 7, 2013

(54) METHOD OF DRIVING LIQUID CRYSTAL DISPLAY DEVICE, AND LIQUID CRYSTAL DISPLAY DEVICE

(75) Inventors: Takashi Katayama, Osaka (JP); Masahiro Shimizu, Osaka (JP)

(73) Assignee: Sharp Kabushiki Kaisha, Osaka (JP)

( * ) Notice: Subject to any disclaimer, the term of this patent is extended or adjusted under 35 U.S.C. 154(b) by 472 days.

(21) Appl. No.: 12/673,053

(22) PCT Filed: Aug. 13, 2008

(86) PCT No.: PCT/JP2008/064551
§ 371 (c)(1),
(2), (4) Date: Feb. 11, 2010

(87) PCT Pub. No.: WO2009/031395
PCT Pub. Date: Mar. 12, 2009

(65) Prior Publication Data
US 2011/0310321 A1   Dec. 22, 2011

(30) Foreign Application Priority Data
Sep. 7, 2007 (JP) .................. 2007-233425

(51) Int. Cl.
G02F 1/133 (2006.01)
G02F 1/1343 (2006.01)
G09G 3/36 (2006.01)
(52) U.S. Cl.
USPC .................. 349/33; 349/39; 345/94

(58) Field of Classification Search ............... 349/33–34
See application file for complete search history.

(56) References Cited

U.S. PATENT DOCUMENTS

| | | | |
|---|---|---|---|
| 6,069,620 A | 5/2000 | Nakamura | |
| 2001/0005247 A1 | 6/2001 | Kikkawa | |
| 2001/0020925 A1 | 9/2001 | Hattori et al. | |
| 2002/0018035 A1* | 2/2002 | Song et al. ............ | 345/87 |
| 2002/0105613 A1 | 8/2002 | Yamakita | |

(Continued)

FOREIGN PATENT DOCUMENTS

| | | |
|---|---|---|
| CN | 1677475 A | 10/2005 |
| JP | 9-185037 | 7/1997 |

(Continued)

OTHER PUBLICATIONS

U.S. Notice of Allowance mailed Feb. 6, 2012 in U.S. Appl. No. 12/673,449.

(Continued)

*Primary Examiner* — Edward Glick
*Assistant Examiner* — Dennis Y Kim
(74) *Attorney, Agent, or Firm* — Nixon & Vanderhye P.C.

(57) ABSTRACT

A method of the present invention, for driving a liquid crystal display device includes the step of applying, when spray-bend transition of liquid crystal molecules is completed, a constant voltage to a storage capacitor electrode so that an electric potential difference between a pixel electrode and a common electrode becomes greater than an electric potential difference between the pixel electrode and another pixel electrode adjacent to said pixel electrode when application of a voltage for the spray-bend transition of the liquid crystal molecules is stopped.

4 Claims, 17 Drawing Sheets

U.S. PATENT DOCUMENTS

| | | |
|---|---|---|
| 2002/0145579 A1 | 10/2002 | Yamakita |
| 2002/0149551 A1 | 10/2002 | Yamakita |
| 2003/0090449 A1 | 5/2003 | Arimoto |
| 2003/0122767 A1 | 7/2003 | Nakao |
| 2005/0062705 A1 | 3/2005 | Yamada |
| 2006/0007084 A1 | 1/2006 | Takeoka |
| 2006/0077157 A1 | 4/2006 | Arimoto |
| 2007/0229447 A1 | 10/2007 | Takahara |

FOREIGN PATENT DOCUMENTS

| | | |
|---|---|---|
| JP | 2001-183666 | 7/2001 |
| JP | 2002-278524 | 9/2002 |
| JP | 2002-328654 | 11/2002 |
| JP | 2003-121881 | 4/2003 |
| JP | 2003-186019 | 7/2003 |
| JP | 2003-295156 | 10/2003 |
| JP | 2005-99212 | 4/2005 |
| JP | 2005-316459 | 11/2005 |
| JP | 2007-219548 | 8/2007 |
| JP | 2007-256793 | 10/2007 |
| JP | 2007-304560 | 11/2007 |
| TW | 538282 | 6/2003 |

OTHER PUBLICATIONS

U.S. Appl. No. 12/673,439, filed Feb. 12, 2010, entitled "Liquid Crystal Display Device Driving Method and Liquid Crystal Display Device".

U.S. Appl. No. 12/673,449, filed Feb. 12, 2010, entitled "Method for Driving Liquid Crystal Display Device and Liquid Crystal Display Device".

International Search Report mailed Nov. 25, 2008 in PCT Application No. PCT/JP2008/064478.

International Search Report mailed Sep. 30, 2008 in PCT Application No. PCT/JP2008/064480.

Chinese Office Action mailed Mar. 29, 2011 and English translation thereof in Chinese application 200880102421.8.

International Search Report for PCT/JP2008/064551, mailed Nov. 25, 2008.

Office Action from U.S. Appl. No. 12/673,439 mailed May 17, 2012; Katayama.

Office Action from U.S. Appl. No. 12/673,439 dated Sep. 28, 2012; Katayama et al.

U.S. Office Action mailed Apr. 6, 2012 in U.S. Appl. No. 12/673,439.

* cited by examiner

F I G. 2
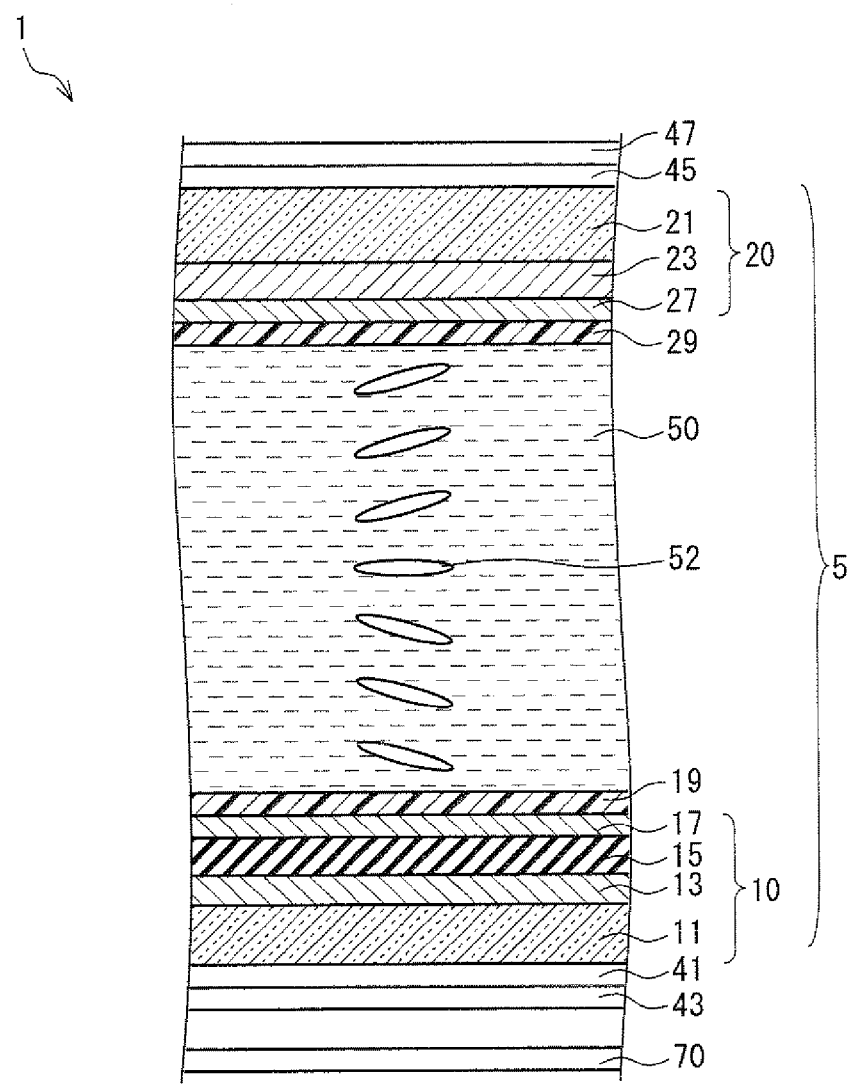

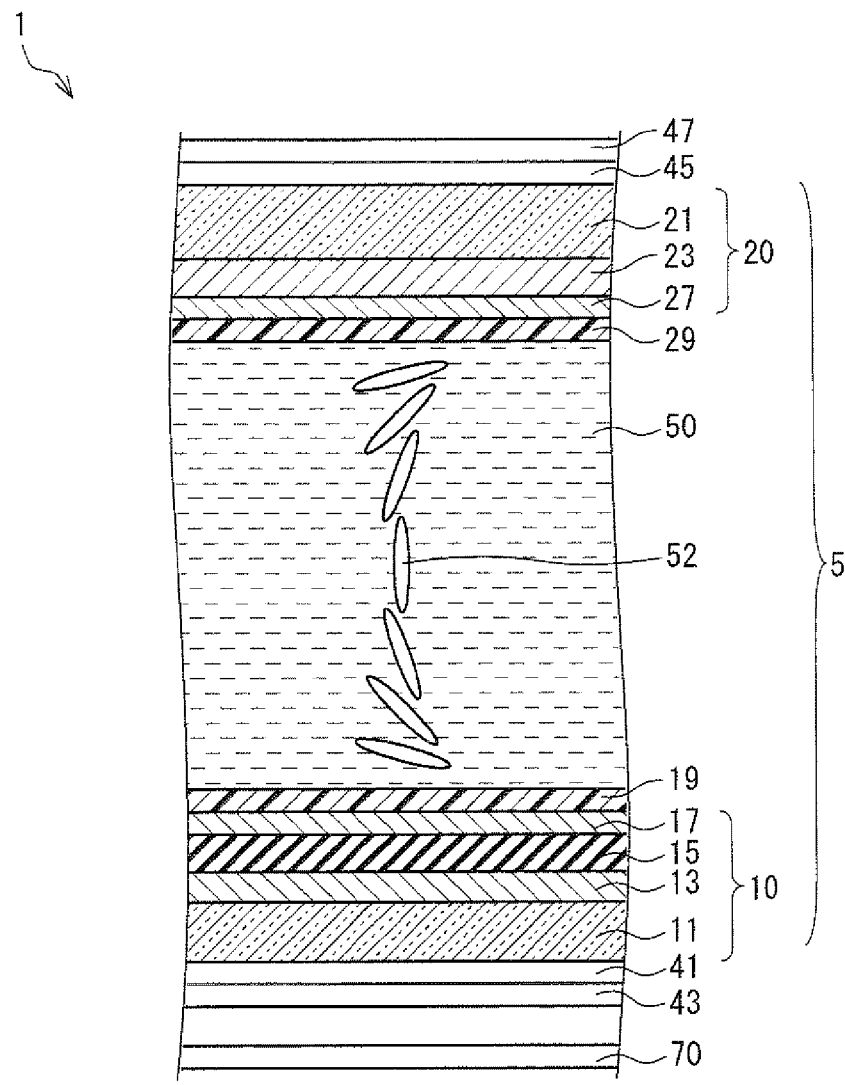
F I G. 3

F I G. 5
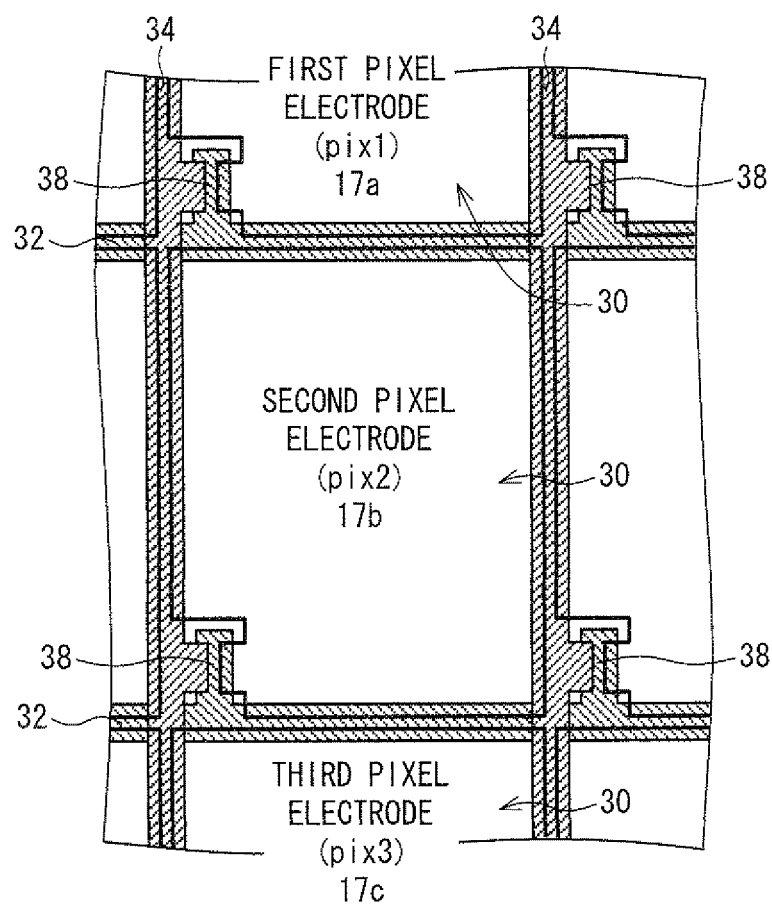

F I G. 7
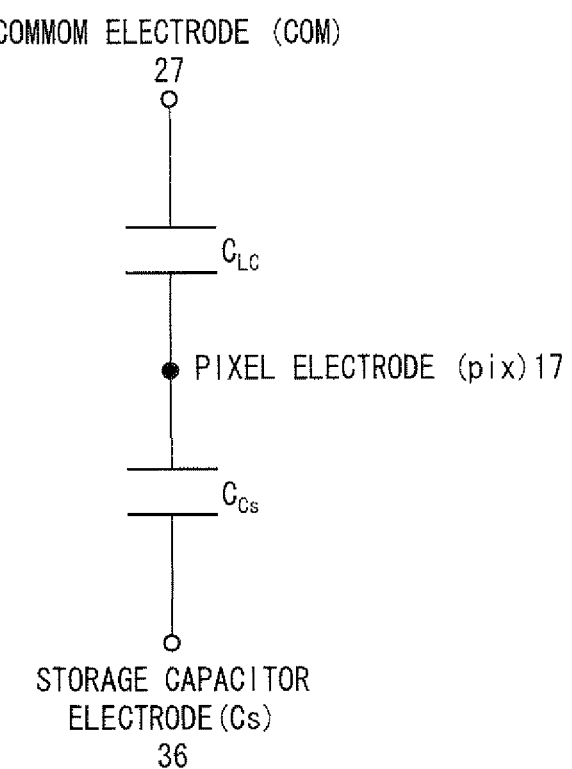

METHOD OF DRIVING LIQUID CRYSTAL DISPLAY DEVICE, AND LIQUID CRYSTAL DISPLAY DEVICE

This application is the U.S. national phase of International Application No. PCT/JP2008/064551, filed 13 Aug. 2008, which designated the U.S. and claims priority to Japanese Patent Application No. 2007-233425, filed Sep. 7, 2007, the entire contents of each of which are hereby incorporated by reference.

TECHNICAL FIELD

The present invention relates to an OCB (Optically Self-Compensated Birefringence) mode liquid crystal display device.

BACKGROUND OF THE INVENTION

Compared with a CRT (Cathode Ray Tube), a liquid crystal display device has advantages of a thin and lightweight body, and low power consumption with a low driving voltage. For this reason, the liquid crystal display device has been conventionally adopted in various electronic devices, such as a television, a laptop PC (Personal Computer), a desktop PC, a PDA (Personal Digital Assistant: mobile terminal), and a mobile phone.

Particularly, a liquid crystal display device (TFT liquid crystal display device) employing a TFT (Thin Film Transistor) element realizes high display quality by switching each pixel via a TFT element.

Meanwhile, as it becomes rapidly popular that a television receiver or the like employs a liquid crystal display device to display moving images, it is required to cause a liquid crystal display panel of the liquid crystal display device to have higher response speed in order to display moving images with high quality.

A liquid crystal display device employing an OCB mode has recently drawn attention. The OCB mode liquid crystal display device (OCB panel) generally has such an arrangement that (i) liquid crystal molecules are sandwiched between two substrates which were subjected to alignment treatment, so that the liquid crystal molecules are aligned parallel to each other in the same direction, (ii) a wave plate is stacked to a surface of each of the substrates, and further, (iii) a polarizer is stacked to each of the substrates so that transmission axes of the polarizers have a cross nicol relationship.

(Reverse Transition)

In a case where the aforementioned OCB liquid crystal display device is used in a normally-white mode (NW mode), which caries out (i) black display while a high voltage is being applied, and (ii) white display while a low voltage is being applied, for example, it is necessary to reduce a voltage applied to a liquid crystal layer down to about a critical voltage ($V_{cr}$) between a spray orientation and a bend orientation so as to realize the white display having a high transmissivity.

This causes, in some cases, a bend-spray transition (reverse transition), which is a phenomenon where liquid crystal molecules that have had the bend orientation have the spray orientation again, thereby causing a defect in a displayed image.

(High White Voltage)

In order to inhibit such a reverse transition, various methods have been proposed. For example, there has been proposed a method of causing a voltage (white voltage) applied during the white display in the normally-white mode to be sufficiently higher than the critical voltage ($V_{cr}$).

However, in this method of increasing the white voltage, since there is a trade-off relationship between the increase in white voltage, and a luminance (as illustrated in FIG. 17), it is difficult to realize an OCB panel having a high luminance.

FIG. 17 is a view showing a relationship between the applied voltage and a transmissivity in an OCB mode liquid crystal display device (normally-white mode). The "$V_{cr}$" is a critical voltage between the spray orientation and the bend orientation.

(Black Insertion)

Further, there is another method to prevent the reverse transition, in which other than an image signal, a signal for inhibiting such a reverse transition phenomenon is supplied (see Patent Literature 1).

Specifically, there has been proposed a method of stably maintaining the bend orientation by inserting the black display once or more within one frame of image display, for example.

CITATION LIST

Patent Literature 1

Japanese Patent Application Publication, Tokukai, No. 2002-328654 A (Publication Date: Nov. 15, 2002)

SUMMARY OF INVENTION (Display Quality)

However, the method of inserting the black display has problems of reduction in display quality due to a reduction in luminance of the white display (white luminance), generation of a flicker, and the like.

(Low Temperature)

Further, if a temperature of the liquid crystal display device is significantly low, response speed of the liquid crystal would become incredibly slow. In this case, even the insertion of the black display within one frame can hardly reset the bend state completely. For this reason, there is a problem that the generation of the reverse transition cannot be inhibited sufficiently.

(Gate Bus Line)

Furthermore, particularly in a case of a TFT liquid crystal display device, there arises such a problem that the reverse transition is likely to be generated above a gate bus line, which is a wiring connected to a TFT.

The following description deals with this problem with reference to (a) and (b) of FIG. 18.

(a) of FIG. 18 is a view showing a state of an orientation of liquid crystal molecules in a pixel where the reverse transition due to the gate bus line does not occur, and (b) of FIG. 18 is a view showing the state of an orientation of liquid crystal molecules in a pixel where the reverse transition due to the gate bus line occurs.

As shown in (a) and (b) of FIG. 18, each pixel 30 of the TFT liquid crystal display device is provided with a TFT element 38, to which a gate bus line 32 and a source bus line 34 are connected. Further, a storage capacitor electrode (Cs: a part of the pixel 30, which part corresponds to a storage capacitor line) 36 is provided in the vicinity of the center of the pixel 30.

The liquid crystal molecules provided above the gate bus line 32 have the bend orientation while a spray-bend transition voltage is being applied. In this case, as shown in (a) of FIG. 18, the liquid crystal molecules have a uniform bend orientation (see a region RB (bend-orientation region) in (a) of FIG. 18) in the pixel 30.

After the application of the transition voltage is finished, however, the orientation of the liquid crystal molecules provided above/along the gate bus line 32 is likely to have the spray orientation (reverse transition due to the gate bus line 32) again.

The spray orientation generated due to the gate bus line 32 spreads out to inside the pixel 30 (see a region RS (spray orientation region) in (b) of FIG. 18). This causes a defect in a displayed image.

Since a voltage equal to or more than the voltage $V_{cr}$ can generate the reverse transition due to the gate bus line 32 (see FIG. 17), it is difficult to inhibit such generation of the reverse transition.

The present invention is made in view of the problem. An object of the present invention is to realize (i) a method of driving a liquid crystal display device, and (ii) a liquid crystal display device, each of which can inhibit a reduction in display quality (reduction in white luminance, flickers, etc.) and simultaneously inhibit generation of a reverse transition.

Further, an object of the present invention is to realize (i) a method of driving a liquid crystal display device, and (ii) a liquid crystal display device, each of which, particularly in an active matrix liquid crystal display device, can (i) inhibit generation of the reverse transition due to a bus line such as a gate bus line, and (ii) display images with high luminance.

In order to attain the object, a method of the present invention, for driving an OCB liquid crystal display device including: a main substrate on which a plurality of pixel electrodes are provided in a grid pattern; a counter substrate on which a common electrode is provided; a liquid crystal layer which is sandwiched between the main substrate and the counter substrate; and a storage capacitor electrode provided on the main substrate, a voltage to be applied to the liquid crystal layer varying in accordance with an electric potential of the common electrode and an electric potential of the storage capacitor electrode, liquid crystal molecules of the liquid crystal layer having a spray orientation while no voltage is applied to the liquid crystal layer, and having a transition from the spray orientation to a bend orientation while a transition voltage is being applied to the liquid crystal layer, includes the step of: causing an electric potential difference between any one of the plurality of pixel electrodes and the common electrode to be greater than an electric potential difference between the any one of the plurality pixel electrodes and a pixel electrode adjacent to the any one of the plurality of the pixel electrode, when application of the transition voltage is stopped.

There are two conditions under which the reverse transition from the bend orientation to the spray orientation occurs, that is, Condition 1: there are liquid crystal molecules tilted in a direction different from a target tilt direction (liquid crystal molecules tilted in a direction opposite to a normal (forward) tilt direction (remaining reverse tilt)), and Condition 2: there is a lateral electric field when the transition voltage is turned off. With the arrangement, the Condition 2 is suppressed. Therefore, it is possible to suppress the generation of the reverse transition from the bend orientation to the spray orientation. The following description explains the method.

In practice, the OCB liquid crystal display device displays images after the spray-bend transition of the liquid crystal molecules is carried out by applying the transition voltage to the liquid crystal molecules having the spray orientation. When the images are actually displayed, the liquid crystal molecules, which have had the bend orientation, are often caused to have the spray orientation again due to a low voltage applied to the liquid crystal molecules, for example (reverse transition).

The inventors of the present invention found, as a result of reviewing conditions under which the reverse transition is generated, that the reverse transition is generated under the Condition 1: remaining reverse tilt, and the Condition 2: lateral electric field when the transition voltage is turned off. Here, the lateral electric field of the Condition 2 is an electric field generated by mainly the electric potential difference between adjacent pixel electrodes, in a direction parallel to the substrate.

How much the lateral electric field of the Condition 2 affects the liquid crystal molecules depends on a magnitude of a vertical electric field. Here, the vertical electric field is an electric field in a direction vertical to the lateral electric field, that is, the direction vertical to the substrate. The vertical electric field is generated by mainly an electric potential difference between the pixel electrode and the common electrode.

Specifically, the vertical electric field affects the lateral electric field in such a manner that, in a case where there are a lateral electric field and a vertical electric field which has a stronger magnitude than the lateral electrode, the lateral electric field has less influence on the liquid crystal molecules. In this case, the lateral electric field hardly causes the reverse transition. This is because, although the liquid crystal molecules tend to have the splay orientation due to the lateral electric field, the vertical electric field which is stronger than the lateral electric field supports stability of the bend orientation.

In consideration of this point, with the arrangement described above, the electric potential difference between the pixel electrode and the common electrode is caused to be greater than the electric potential difference between the pixel electrode and another pixel electrode adjacent to said pixel electrode, when the application of the transition voltage for the spray-bend transition is stopped.

That is, since the magnitude of the vertical electric field is greater than that of the lateral electric field, even in a case where there is the lateral electric field due to an electric potential difference between adjacent pixel electrodes, for example, the lateral electric field hardly contributes to the generation of the reverse transition. In other words, the Condition 2 is hardly satisfied, so that it becomes possible to suppress the generation of the reverse transition.

Further, with the arrangement, it is unnecessary to change the driving voltage (high white voltage, for example) for actually displaying images, or to apply a signal for suppressing the reverse transition phenomenon, which signal is different from the image signal for actually displaying images (such as black insertion).

Accordingly, the method of the present invention, for driving a liquid crystal display device has an effect of suppressing the generation of the reverse transition, and simultaneously suppressing the reduction in display quality (reduction in white luminance, generation of flicker, etc.).

Further, the method of the present invention does not require the signal for suppressing the reverse transition phenomenon, which signal is different from the image signal. Therefore, even in a case where the response speed of the liquid crystal molecules is slow due to a significantly low temperature of the liquid crystal display device, it is possible to suppress the reverse transition.

In the method of the present invention, for driving a liquid crystal display device, an alternating-current voltage is applied to the storage capacitor electrode so as to cause the liquid crystal display device to be subjected to inversion driving during normal driving; and when the application of the transition voltage is stopped, a voltage, which (i) does not cause the liquid crystal molecules to have a transition from the bend orientation to the spray orientation and (ii) has a smaller amplitude than that of the alternating-current voltage applied during the normal driving, is preferably applied to the storage capacitor electrode.

With the arrangement, the voltage, which (i) does not cause the liquid crystal molecules to have a transition from the bend orientation to the spray orientation and (ii) has a small amplitude, is applied to the storage capacitor electrode, so that the electric potential difference between the adjacent pixel electrodes can be reduced. This makes it possible to cause the electric potential difference between the pixel electrode and the common electrode to be greater than the electric potential difference between the pixel electrode and another pixel electrode adjacent to said pixel electrode, by only changing the voltage applied to the storage capacitor electrode. Accordingly, it becomes possible to easily suppress the generation of the reverse transition.

In the method of the present invention, for driving a liquid crystal display device, when the application of the transition voltage is stopped, the voltage applied to the storage capacitor electrode preferably has an amplitude of 0.

With the arrangement, it is possible to reduce the electric potential difference between the adjacent pixel electrodes by applying the voltage having an amplitude of 0 (direct current (DC) signal) to the storage capacitor electrode, that is, by applying a constant voltage to the storage capacitor electrode. For this reason, it is possible to suppress the generation of the reverse transition easily and successfully by only changing the voltage applied to the storage capacitor electrode.

In the method of the present invention, for driving a liquid crystal display device, a plurality of switching elements are provided in the respective plurality of pixel electrodes, each of the plurality of switching elements is a transistor element, and a plurality of gate bus lines and a plurality of source bus lines are provided on the main substrate so as to form a grid pattern, the each of the plurality of transistor elements is connected to at least one of the plurality of gate bus lines and at least one of the plurality of source bus lines, at least one of (i) a corresponding one of the plurality of gate bus lines and (ii) a corresponding one of the plurality of source bus lines is provided between any adjacent two of the plurality of pixel electrodes, and all of the plurality of gate bus lines are turned on, when the application of the transition voltage is stopped.

With the arrangement, all of the gate bus lines are turned on, so that the identical electric potential is written to each of the pixel electrodes from the corresponding source bus line. Therefore, no electric potential difference is generated between the adjacent pixel electrodes. This makes it possible to easily suppress the generation of the lateral electric field.

In the method of the present invention, for driving a liquid crystal display device, a response time period of the liquid crystal molecules is preferably not more than a time period during which the voltage having the smaller amplitude than that of the alternating-current voltage applied during the normal driving is applied to the storage capacitor electrode.

Further, in the method of the present invention, for driving a liquid crystal display device, a response time period of the liquid crystal molecules is preferably not more than a time period during which all of the plurality of gate bus lines are in an on-state.

With the arrangement, the response time period of the liquid crystal molecules is not more than the time period during which the generation of the lateral electric field is suppressed. Accordingly, even in a case where the reverse tilt remains, the reverse tilt is likely to be suppressed successfully. Therefore, it is possible to suppress the generation of the reverse transition more successfully. Note that the response time period varies in accordance with physicality of the liquid crystal molecules, or the like.

In the method of the present invention, for driving a liquid crystal display device, the voltage having the smaller amplitude than that of the alternating-current voltage applied during the normal driving is preferably started to be applied to the storage capacitor electrode, from before the application of the transition voltage is stopped.

With the arrangement, the voltage having a small amplitude is started to be applied to the storage capacitor electrode from before the application of the transition voltage is stopped. Accordingly, the lateral electric field is suppressed during the spray-bend transition, thereby allowing the spray-bend transition to be completed in a shorter time period more successfully.

Further, in the method for the present invention, for driving a liquid crystal display device, all of the plurality of gate bus lines are preferably being turned on from before the application of the transition voltage is stopped.

With the arrangement, all of the gate bus lines are turned on during the spray-bend transition. Therefore, even if the spray-bend transition spreads out and the region of the bend orientation becomes larger, it is possible to create the state where the charging is always carried out with respect to the pixel electrode. It follows that the decrease in the voltage applied to the liquid crystal layer hardly occurs during the spray-bend transition, thereby allowing the spray-bend transition to be completed in a shorter time period.

In the method of the present invention, for driving a liquid crystal display device, a time period, during which no electric potential difference occurs between the any adjacent two of the plurality of pixel electrodes between which a corresponding one of the plurality of gate bus lines is provided, is preferably secured by causing all of the plurality of gate bus lines to be simultaneously turned on so that voltages having an identical polarity are applied to the respective any adjacent two of the plurality of pixel electrodes during a time period of the first step during which the transition voltage is being applied.

With the arrangement, within the time period during which the transition voltage is applied to the liquid crystal layer so as to carry out the spray-bend transition, no electric potential difference is generated between any of the pixel electrodes and at least one pixel electrode which is adjacent to the any of the pixel electrodes. If no electric potential difference is generated between the pixel electrodes, no lateral electric field would be generated between such pixel electrodes.

Accordingly, the bend orientation generated in a single pixel is likely to spread out over the single pixel toward the adjacent pixel. This phenomenon becomes greater particularly in a case where the liquid crystal molecules have a positive dielectric anisotropy.

As described above, the method for driving the liquid crystal display device having the arrangement described above has an effect of suppressing the reduction in display quality and the generation of the reverse transition during the spray-bend transition, and further, simultaneously, another effect of carrying out the spray-bend transition over the entire display surface in a short time period.

In the method of the present invention, for driving a liquid crystal display device, a response time period of the liquid crystal molecules is preferably not more than the time period during which all of the plurality of gate bus lines are simultaneously turned on so that voltages having an identical polarity are applied to the respective any adjacent two of the plurality of pixel electrodes between which a corresponding one of the plurality of gate bus lines is provided.

With the arrangement, the response time period of the liquid crystal molecules is not more than the time period during which the generation of the lateral electric field is suppressed, so that the bend orientation spreads out toward the adjacent pixel more successfully.

A liquid crystal display device of the present invention is preferably driven by the aforementioned method for driving a liquid crystal display device.

With the arrangement, it is possible to realize a liquid crystal display device in which the reverse transition hardly occurs.

As described above, either the method of the present invention, for driving a liquid crystal display device, or the liquid crystal display device of the present invention, is such that the electric potential difference between the pixel electrode and the common electrode is caused to be greater than the electric potential difference between the pixel electrode and another pixel electrode adjacent to said pixel electrode, when the application of the transition voltage for the spray-bend transition is stopped.

Therefore, it is possible to realize a method of driving a liquid crystal display device, and a liquid crystal display device, each of which can suppress the reduction in display quality, and simultaneously suppress the generation of the reverse transition.

BRIEF DESCRIPTION OF THE SEVERAL VIEWS OF THE DRAWINGS

FIG. 2 is a cross-sectional view schematically illustrating an arrangement of an OCB mode liquid crystal display device.

FIG. 3 is a cross-sectional view schematically illustrating an arrangement of the OCB mode liquid crystal display device.

FIG. 5 is a view illustrating a positional relationship between pixel electrodes adjacent to each other.

FIG. 7 is a view illustrating an equivalent circuit of a pixel.

FIG. 16 is a view illustrating the lateral electric field in a case where all gate bus lines are turned on.

REFERENCE SIGNS LIST

1. LIQUID CRYSTAL DISPLAY DEVICE
5. LIQUID CRYSTAL DISPLAY PANEL
10. FIRST SUBSTRATE (MAIN SUBSTRATE)
11. FIRST GLASS SUBSTRATE
13. WIRING LAYER
15. INSULATING LAYER
17. PIXEL ELECTRODE
17a. FIRST PIXEL ELECTRODE
17b. SECOND PIXEL ELECTRODE
17c. THIRD PIXEL ELECTRODE
19. FIRST ALIGNMENT FILM
20. SECOND SUBSTRATE (COUNTER SUBSTRATE)
21. SECOND GLASS SUBSTRATE
23. COLOR FILTER
27. COMMON ELECTRODE
29. SECOND ALIGNMENT FILM
30. PIXEL
32. GATE BUS LINE
34. SOURCE BUS LINE
36. STORAGE CAPACITOR ELECTRODE
38. TFT ELEMENT
41. FIRST OPTICAL COMPENSATION FILM
43. FIRST POLARIZER
45. SECOND OPTICAL COMPENSATION FILM
47. SECOND POLARIZER
50. LIQUID CRYSTAL LAYER
52. LIQUID CRYSTAL MOLECULES
60. DISPLAY CONTROL CIRCUIT
62. GATE DRIVER
64. SOURCE DRIVER
66. GRAY SCALE VOLTAGE SOURCE
68. COMMON ELECTRODE DRIVING POWER SOURCE
70. BACKLIGHT
RN. FORWARD TILT REGION
RR. REVERSE TILT REGION
RB. BEND ORIENTATION REGION
RS. SPRAY ORIENTATION REGION
$V_{cr}$. SPRAY-BEND CRITICAL VOLTAGE
$V_{pp}$. VOLTAGE BETWEEN PIXEL ELECTRODES ($V_{p-p}$)
$V_{LC}$. VOLTAGE BETWEEN COMMON ELECTRODE AND PIXEL ELECTRODE
$\Delta V_{pix}$. VOLTAGE FLUCTUATION OF PIXEL
$\Delta V_{pix}^{COM}$. VOLTAGE FLUCTUATION OF PIXEL DUE TO VOLTAGE FLUCTUATION OF COMMON ELECTRODE $\Delta V_{pix}^{Cs}$. VOLTAGE FLUCTUATION OF PIXEL DUE TO VOLTAGE FLUCTUATION OF STORAGE CAPACITOR ELECTRODE
$\Delta V_{COM}$. VOLTAGE FLUCTUATION OF COMMON ELECTRODE
$\Delta V_{Cs}$. VOLTAGE FLUCTUATION OF STORAGE CAPACITOR ELECTRODE
$C_{LC}$. LIQUID CRYSTAL CAPACITOR
$C_{Cs}$. STORAGE CAPACITOR
$C_p$. PIXEL CAPACITOR

DETAILED DESCRIPTION OF EMBODIMENTS

Embodiment 1

One embodiment of the present invention is described below with reference to FIGS. 1 through 13.
(Schematic Arrangement of Liquid Crystal Display Device)
First, an arrangement of a liquid crystal display device 1 is described below with reference to FIG. 1, which is a block diagram schematically illustrating an entire arrangement of the liquid crystal display device 1.

Figure 1:
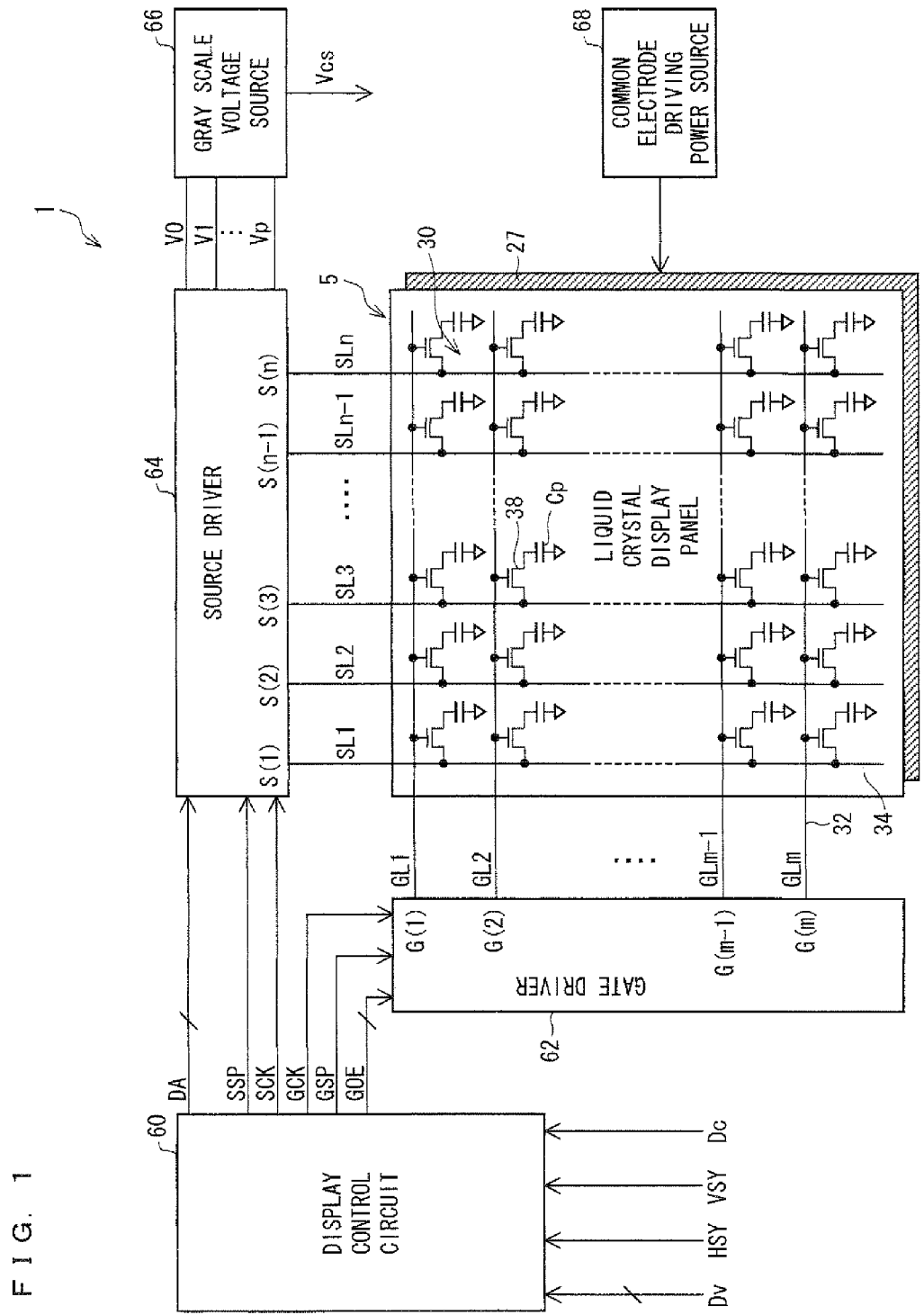
FIG. 1 is a block diagram schematically illustrating an arrangement of a liquid crystal display device, showing an embodiment of the present invention.

As illustrated in FIG. 1, the liquid crystal display device 1 of the present embodiment includes: a gate driver 62 serving as a scan signal line driving circuit; a source driver 64 serving as a data signal line driving circuit; a display control circuit 60 for controlling the gate driver 62 and the source driver 64; a gray scale voltage source 66; a common electrode driving power supply 68 for driving a common electrode 27; and an active matrix (TFT) liquid crystal display panel 5.

Further, the liquid crystal display panel 5 of the liquid crystal display device 1 includes: gate bus lines 32 (GL1 through GLm) serving as a plurality of (m) scan signal lines; source bus lines 34 (SL1 through SLn) serving as a plurality of (n) data signal lines each of which intersects with the gate bus lines 32; and a plurality of (m×n) pixels 30 provided to correspond to respective intersections of the gate bus lines 32 (GL1 through GLm) and the source bus lines 34 (SL1 through SLn).

The plurality of pixels 30 are disposed in matrix so as to constitute a pixel array. Each of the plurality of pixels 30 is provided with: a TFT element 38 serving as a switching element; a pixel electrode (not illustrated) connected to a drain terminal of the TFT element 38; and a storage capacitor electrode (not illustrated) shared by the plurality of pixels 30.

Further, the TFT element 38 serving as the switching element is such that its gate terminal is connected to the gate bus line 32 which passes through the corresponding intersection, and its source terminal is connected to the source bus line 34 which passes through the corresponding intersection.

A pixel capacitor $C_p$ is constituted by a liquid crystal capacitor $C_{LC}$ formed by a pixel electrode 17 and the common electrode 27, and a storage capacitor $C_{Cs}$ formed by the pixel electrode 17 and a storage capacitor electrode (storage capacitor line).
(Schematic Description with Regard to Driving)
Next, the following description explains how to drive the liquid crystal display device 1.

The pixel electrode 17 of each pixel 30 receives, from the date driver 62 and the source driver 64, an electric potential in accordance with a target image to be displayed. This causes a voltage corresponding to an electric potential difference between the pixel electrode 17 and the common electrode 27 to be applied to a liquid crystal layer 50 (liquid crystal molecules 52). An amount of light transmitted through the liquid crystal layer 50 is controlled by the application of the voltage, so that images are displayed.

More specifically, during normal driving for displaying images or the like on the liquid crystal display panel 5, the gate driver 62 selects, per each frame period (each vertical scanning period), the gate bus lines GL1 through GLm sequentially every substantially one horizontal scanning period (line sequential driving), so as to write corresponding one of data signals S (1) through S (n) with respect to each of the pixels 30. At this point, a rectangular wave in accordance with the selection of the gate bus lines 32 is applied to the common electrode 27, for example. As a result, inversion driving, such as line inversion or dot inversion, is carried out.

In FIG. 1, "DA" is a digital image signal, "SSP" is a source start pulse signal, "SCK" is a source clock signal, "GCK" is a gate clock signal, "GSP" is a gate start pulse signal, "GOE" is a gate driver output control signal, "Dv" is a digital video signal, "HSY" is a horizontal synchronization signal, "VSY" is a vertical synchronization signal, "Dc" is a control signal, and "VCs" is a storage capacitor electrode application voltage.
(Arrangement of Liquid Crystal Display Panel)
Next, the following description deals with an arrangement of the liquid crystal display panel 5, which constitutes a main part of the liquid crystal display device 1, with reference to FIGS. 2 and 3. Here, FIGS. 2 and 3 are cross sectional views each of which schematically illustrates the arrangement of the OCB mode liquid crystal display device 1.

The OCB liquid crystal display panel 5 is constituted such that liquid crystal molecules 52 are sandwiched between two substrates (first substrate 10, second substrate 20) which have been subjected to alignment processing so as to cause the liquid crystal molecules 52 to be aligned parallel to each other in the same direction. A surface of each of the two substrates is provided with a wave plate (first optical compensation film 41, second optical compensation film 45), on which a polarizer (first polarizer 43, second polarizer 47) is further provided so that transmission axes of the polarizers have a cross nicol relationship.

More specifically, the liquid crystal display panel 5 includes (i) the first substrate 10 serving as the TFT substrate (active matrix substrate, main substrate) having such an arrangement that a first glass substrate 11 is provided with: a wiring layer 13 including the TFT (Thin Film Transistor) element 38, a storage capacitor line (storage capacitor electrode in a pixel), and the like; an insulating layer 15; the pixel electrode 17; and a first alignment film 19, and (ii) the second substrate 20 serving as a counter substrate having such an arrangement that a second glass substrate 21 is provided with: a color filter 23; the common electrode 27; and a second alignment film 29. The liquid crystal display panel 5 is constituted such that a liquid crystal layer 50 including the liquid crystal molecules 52 is sandwiched between the first substrate 10 and the second substrate 20.

Further, the first optical compensation film (wave plate) 41 and the first polarizer 43 are provided on a surface of the first glass substrate 11, which surface is opposite to the surface having the wiring layer 13, and the second optical compensation film (wave plate) 45 and the second polarizer 47 are provided on a surface of the second glass substrate 21, which surface is opposite to the surface having the color filter 23.

Here, the wave plate (the first optical compensation film 41, the second optical compensation film 45) may be a wave plate whose main axis shows hybrid alignment, and which generates a negative phase difference.

Further, a backlight 70 is provided on a backside surface of the liquid crystal display panel 5.

More specifically, the first alignment film 19 and the second alignment film 29 have been subjected to alignment processing by rubbing (rubbing alignment processing). As described below, this alignment processing is carried out in such a manner that surfaces of two substrates (the TFT substrate and the counter substrate), which surfaces face each other, are subjected to the rubbing so that the liquid crystal molecules 52 have a spray orientation while no voltage is applied, and have a bend orientation while a voltage is being applied.

The first glass substrate 11 and the second glass substrate 21 are attached to each other with a predetermined distance maintained between them by use of spherical spacers or column spacers (not illustrated).

Generally, liquid crystal molecules having a positive dielectric anisotropy are used as the liquid crystal molecules 52 sandwiched between the two glass substrates, which liquid crystal molecules 52 constitute the liquid crystal layer 50. Here, the liquid crystal molecule 52 having the positive dielectric anisotropy is the one having such a characteristic that while a voltage is being applied to the liquid crystal molecule 52, the liquid crystal molecule 52 is oriented such that its longitudinal direction becomes parallel to an electric field.

Further, each of the polarizers (the first polarizer 43 and the second polarizer 47) attached to the respective substrates is arranged so that its transmission axis is in a direction at 45° and 135° (cross nicol) with respect to the alignment direction of the liquid crystal molecules 52 on the corresponding substrate, that is, with respect to the direction of the rubbing alignment processing.

(Arrangement of Pixel)

Figure 18:
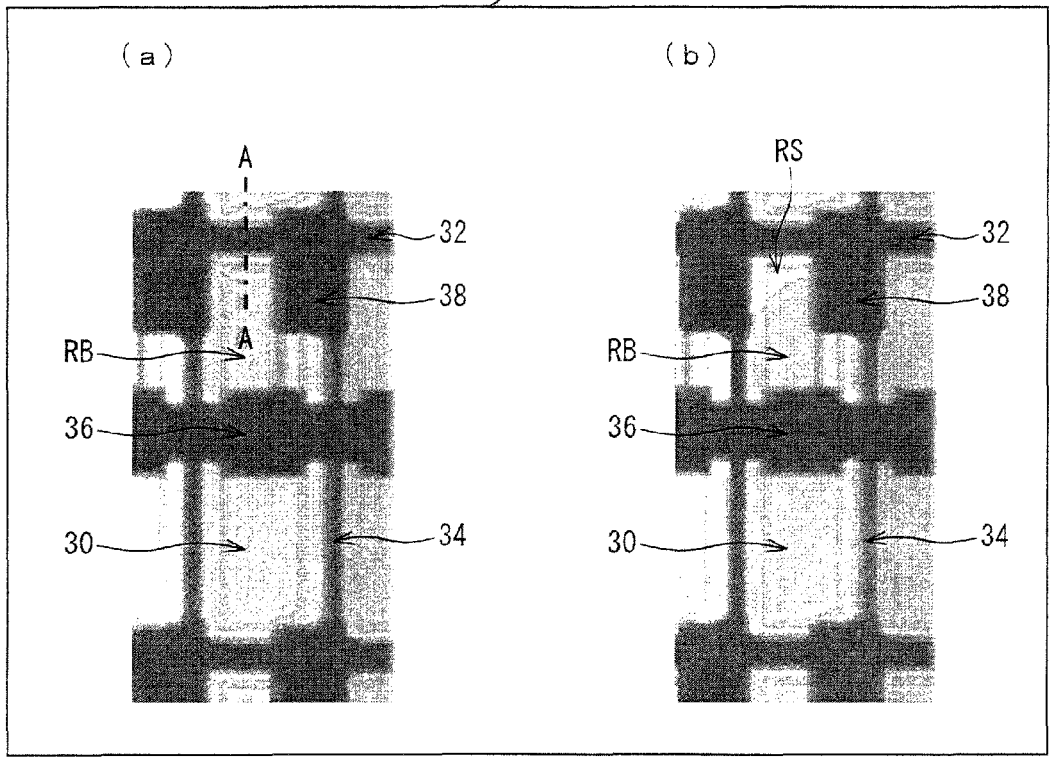
FIG. 18 is a view showing a state of the orientation of liquid crystal molecules ((a) of FIG. 18 shows a state of the orientation of liquid crystal molecules in a pixel where a reverse transition due to a gate bus line does not occur, and (b) of FIG. 18 shows a state of the orientation of liquid crystal molecules in a pixel where the reverse transition due to the gate bus line occurs).

Next, the following description deals with an arrangement of the pixel 30 of the liquid crystal display panel 5 of the present embodiment with reference to (a) of FIG. 18.

Each pixel 30 of the present embodiment is provided with the TFT element 38, as illustrated in (a) of FIG. 18, which is a view showing a state of an orientation of the liquid crystal molecules in the pixel 30. A gate bus line 32 and a source bus line 34 are connected to the TFT element 38. The pixel 30 is surrounded by the gate bus line 32 and the source bus line 34.

Further, a storage capacitor electrode (storage capacitor line) 36 is provided in the vicinity of the center of the pixel 30.

Furthermore, the gate bus line 32 and the source bus line 34 are connected to the gate driver 62 and the source driver 64, respectively.

(Orientation of Liquid Crystal Molecules)

Next, the following description deals with the orientation of the liquid crystal molecules 52 in the OCB mode with reference to FIGS. 2 and 3.

As described above, FIGS. 2 and 3 are cross sectional views each of which schematically illustrates an arrangement of the OCB mode liquid crystal display device 1. FIG. 2 illustrates the orientation of the liquid crystal molecules 52 while no voltage is applied, and FIG. 3 illustrates the orientation of the liquid crystal molecules 52 while a voltage is being applied.

The liquid crystal molecules 52 of the OCB mode liquid crystal display device 1 have the spray orientation while no voltage is applied, as illustrated in FIG. 2. The orientation of the liquid crystal molecules 52 becomes the bend orientation from the spray orientation (spray-bend transition), when a voltage is applied, as illustrated in FIG. 3. Images are displayed by changing an inclination angle of the liquid crystal molecules 52 having the bend orientation.

More specifically, at the time immediately after being injected between the substrates, the liquid crystal molecules 52 have the spray orientation (initial orientation) in which the liquid crystal molecules 52 are substantially parallel to the first substrate 10, as illustrated in FIG. 2. Generally, the transition of the orientation of the liquid crystal molecules 52 from the spray orientation to the bend orientation is carried out by applying a voltage to the liquid crystal molecules 52. That is, in a case where a relatively high voltage (transition voltage) (25V, for example) is applied to the liquid crystal molecules 52 having the spray orientation, the transition from the spray orientation to the bend orientation occurs. At this point, the liquid crystal molecules 52 within a display surface are sequentially oriented to have the bend orientation illustrated in FIG. 3.

Here, as described above, in practice, the OCB liquid crystal display device 1 displays images in the bend orientation state, so that it is necessary to carry out the spray-bend transition every time the liquid crystal display device 1 is turned on.

After the spray-bend transition is completed, the application of the transition voltage is stopped. It follows that the liquid crystal display device 1 operates in a normal driving mode.

(Displaying Images in Practice)

As described above, in practice, the liquid crystal display device 1 displays images after the completion of the spray-bend transition (that is, the liquid crystal display device 1 displays images in the bend orientation state). Specifically, in practice, images are displayed as described below.

That is, when an on-voltage of a voltage (display voltage) for displaying images is applied to the liquid crystal molecules 52 having the bend orientation, the liquid crystal molecules 52 are induced to be oriented in a direction vertical to the two substrates as compared with a state where an off-voltage of the display voltage is applied. In other words, the liquid crystal molecules 52 are induced to have angles closer to 90° with respect to the two substrates.

Any images are displayed in the bend orientation state in such a manner that the angles of the liquid crystal molecules 52 are changed to display black and white. This change in angle is carried out with significantly high speed so that the OCB liquid crystal display device 1 can display high-quality moving images.

(Application of Transition Voltage in the Present Embodiment)

The liquid crystal display device 1 of the present embodiment uses a transition voltage (which is applied to the liquid crystal molecules 52 when the spray-bend transition is carried out) different from a conventional transition voltage, so as to inhibit said reverse transition from the bend orientation to the spray orientation. The following explanations are made with a comparison between the method of the present embodiment and a conventional method for applying a transition voltage, and the like.

(Mechanism of Generation of Reverse Transition)

First, the following description explains a mechanism of generation of the reverse transition, particularly with an example of the reverse transition due to the gate bus line 32.

As described above, the liquid crystal molecules 52 in a region above the gate bus line 32 and in a region along the gate bus line 32 easily generate the reverse transition even with a voltage equal to or more than $V_{cr}$ (spray-bend critical voltage), that is, the orientation of the liquid crystal molecules 52 easily turns from the bend orientation back to be the spray orientation.

Therefore, in order to inhibit the reverse transition due to the gate bus line 32, first, a reason of the generation of the reverse transition was analyzed.

The analysis showed that the reverse transition is likely to be generated in a case where both two conditions (Condition 1 and Condition 2) described below are satisfied.
Condition 1: Remaining Reverse Tilt The Condition 1 is a state where reverse tilt remains, particularly, above the gate bus line 32.
Condition 2: Lateral Electric Field When the Transition Voltage is Turned Off The Condition 2 is a state where there is a lateral electric field immediately after the transition voltage is turned off.

It was found that in a case where both the above conditions are satisfied, the reverse transition is likely to be generated above the gate bus line 32.

This shows that when the lateral electric field is applied to reverse-tilted liquid crystal molecules 52, the spray orientation is induced, and thereby the reverse transition is likely to occur.

Further, it was found that the reverse transition is likely to occur particularly in a case where the lateral electric field (voltage ($V_{pp}$) between the pixel electrodes which are adjacent to each other via the gate bus line) is greater than the vertical electric field (voltage ($V_{LC}$) between the common electrode and the pixel electrode). The following description explains this more specifically. It should be noted that, hereinafter, the "normal display state" serves as a state where images are displayed, and the "normal driving" serves as each electrode voltage in the normal display state.
Condition 1: Remaining Reverse Tilt The "reverse tilt" means a state where the liquid crystal molecules 52 in a certain region tilt up in a direction opposite to a direction in which the liquid crystal molecules 52 existing in the other region tilt.

Figure 4:
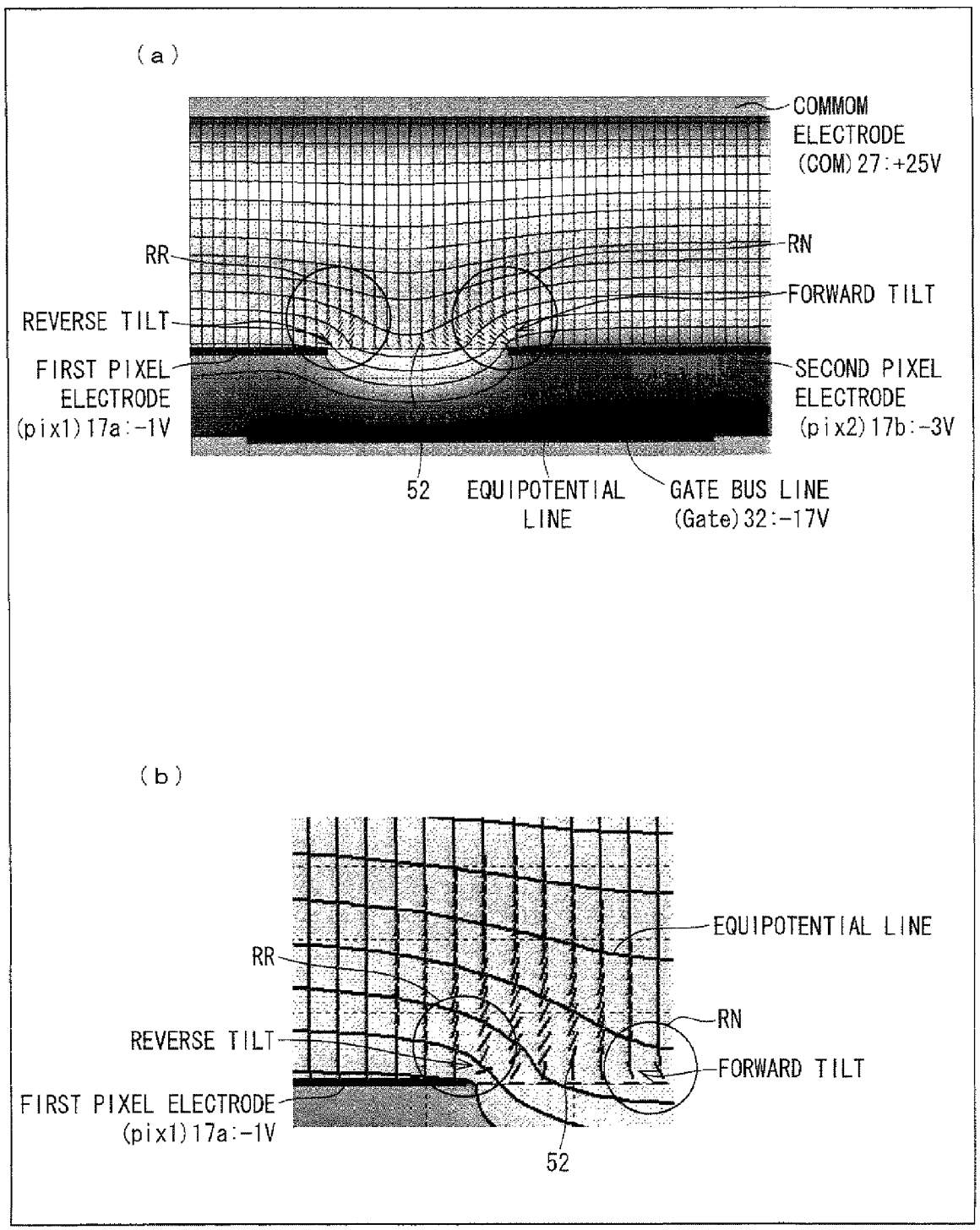
FIG. 4 is a view schematically showing a state of an orientation of liquid crystal molecules while a transition voltage is being applied.

The following description deals with the reverse tilt with reference to (a) and (b) of FIG. 4, each of which schematically shows the orientation state of the liquid crystal molecules 52 while the transition voltage is applied. (b) of FIG. 4 is an enlarged view showing a part of (a) of FIG. 4, and (a) of FIG. 4 corresponds to a cross section taken along the line A-A of (a) of FIG. 18.

Further, FIG. 5 illustrates a positional relationship between a first pixel electrode 17a, a second pixel electrode 17b, and the gate bus line 32, each of which is shown in (a) and (b) of FIG. 4. FIG. 5 is a view illustrating a positional relationship between adjacent pixel electrodes 17 (a first pixel electrode (pix 1) 17a, a second pixel electrode (pix 2), and a third pixel electrode (pix 3) 17c). As illustrated in FIG. 5, the gate bus line 32 is provided between the first pixel electrode 17a and the second pixel electrode 17b, which are adjacent to each other, and another gate bus line 32 is provided between the second pixel electrode 17b and the third pixel electrode 17c which are adjacent to each other.

As shown in (a) of FIG. 4, while the transition voltage is applied, a tilt direction of the liquid crystal molecules 52 in a region RR which is in the vicinity of an edge of the first pixel electrode 17a, is different from a tilt direction of the liquid crystal molecules 52 in a region RN which is in the vicinity of an end of the second pixel electrode 17b. That is, (a) of FIG. 4 shows the generation of the reverse tilt in the vicinity of edges of the pixel electrode 17 while a high voltage is being applied to a common electrode (COM) 27.

Further, among the tilt directions of the liquid crystal molecules 52 in the regions RR and RN, the tilt direction of the liquid crystal molecules 52 in the region RR is such that a state (forward tilt) before the transition voltage was applied was changed (reverse tilt) by the application of the transition voltage. In other words, before the transition voltage was applied, the liquid crystal molecules 52 in the region RR tilted in the same direction (forward tilt) as the tilt direction of the liquid crystal molecules 52 in the region RN.

The application of a high voltage causes an equipotential line to be warped between the first pixel electrode 17a and the second pixel electrode 17b, so that the application of the transition voltage changes the tilt direction of the liquid crystal molecules 52, and causes the reverse tilt.

That is, as shown in (a) of FIG. 4, in the vicinity of the end (edge) of the first pixel electrode 17a and in the vicinity of the end (edge) of the second pixel electrode 17b, the equipotential line is warped in directions opposite to each other so that the liquid crystal molecules 52 are twisted. Since the directions in which the equipotential line is warped are opposite to each other, the tilt direction of the liquid crystal molecules 52 in the region RR becomes opposite to the tilt direction of the liquid crystal molecules 52 in the region RN. It follows that the liquid crystal molecules 52 in one of the regions RR and RN cause the reverse tilt.

Further, as illustrated in (a) of FIG. 18, in a general active matrix liquid crystal display device using the TFT element 38, the gate bus line 32 is provided in a lower layer region (between the pixel electrode 17 and the first glass substrate 11) between the pixel electrodes 17 adjacent to each other.

Accordingly, the reverse tilt remains in the vicinity of the edge of the pixel electrode 17, and simultaneously above the gate bus line 32. Note that (b) of FIG. 4 is an enlarged view showing the region where the liquid crystal molecules 52 are twisted particularly in the vicinity of the gate bus line 32 and cause the reverse tilt.
(Applied Voltage of Conventional Method)

In a case where the transition voltage applied to the liquid crystal layer 50 is rapidly reduced in accordance with a conventional technique, for example, the reverse tilt is not suppressed, and is likely to remain. The following description explains this with reference to FIG. 6, which is a view illustrating a flow of the applied voltage toward the common electrode and the storage capacitor electrode.

First, the following description deals with a relationship between the common electrode and the storage capacitor electrode with reference to FIG. 7, which illustrates an equivalent circuit of the pixel 30. As illustrated in FIG. 7, the pixel 30 of the present embodiment has the liquid crystal capacitor ($C_{LC}$) formed between the pixel electrode (pix) 17 and the common electrode (COM) 27, the storage capacitor ($C_{Cs}$) formed between the pixel electrode (pix) 17 and the storage capacitor electrode (Cs) 36. The pixel electrode 17 is provided at the center position between the liquid crystal capacitor ($C_{LC}$) and the storage capacitor ($C_{Cs}$). A ratio of the liquid crystal capacitor ($C_{LC}$) to the storage capacitor ($C_{Cs}$) can be arbitrarily determined.

Figure 6:
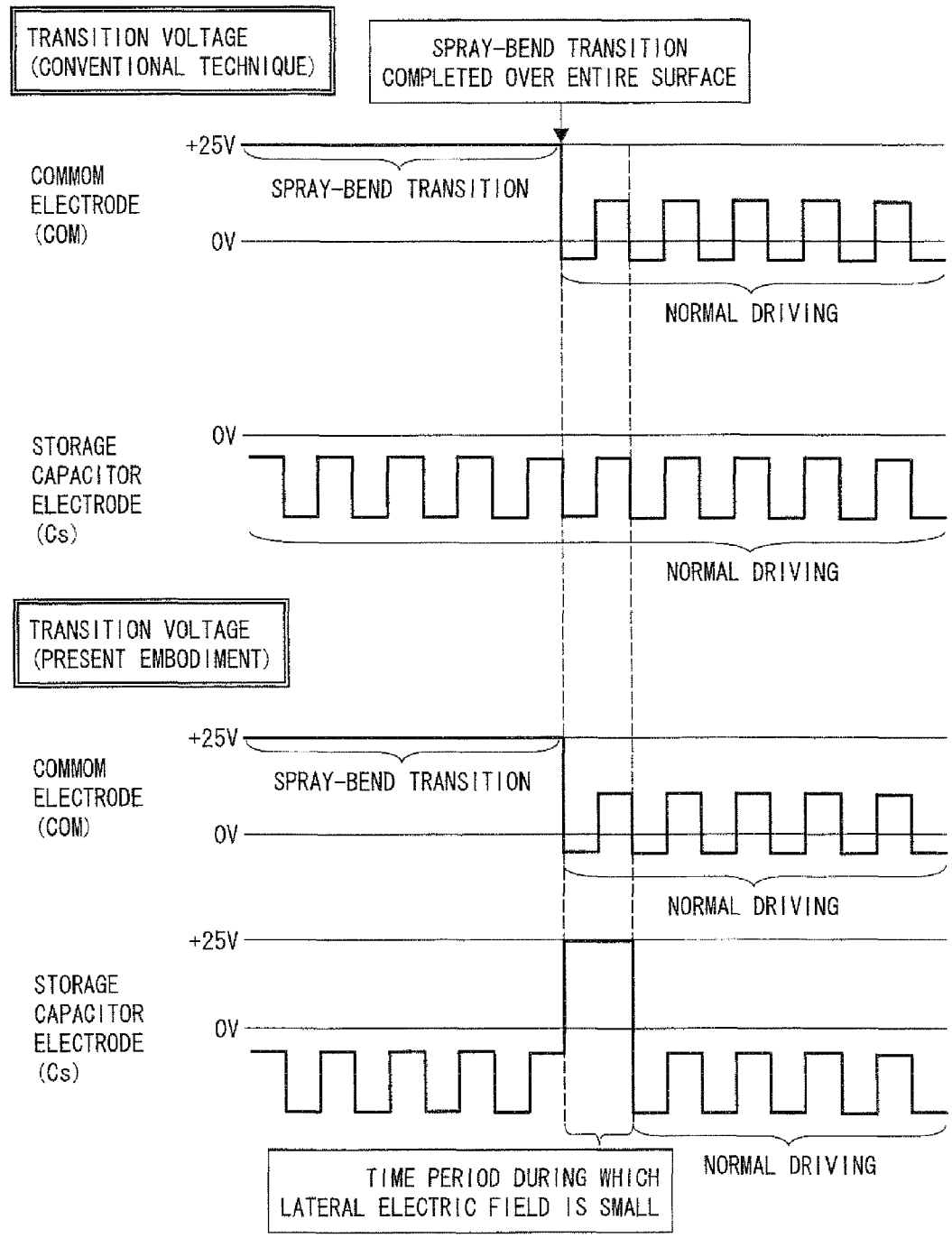
FIG. 6 is a view illustrating a flow of an applied voltage toward each of a common electrode and a storage capacitor electrode.

For the transition from the spray orientation to the bend orientation, conventionally, first, a direct-current (DC) voltage (constant voltage) of +25V is applied to the common electrode (COM) as the transition voltage, and the application of the DC voltage is maintained until the transition from the spray orientation to the bend orientation is completed (see the "transition voltage (conventional technique)" of FIG. 6).

Then, after the transition from the spray orientation to the bend orientation is completed over an entire display surface, the application of the transition voltage is stopped instantly (abruptly), and is followed by the normal driving such as inversion driving. At this point, since the application of the transition voltage is abruptly stopped, the voltage applied to the liquid crystal layer 50 is instantly reduced. This causes the reverse tilt generated during the period of the application of the transition voltage to be likely to remain without any change. As described above, the reverse tilt is likely to remain in the liquid crystal molecules 52 above the gate bus line 32.

Further, here, a degree of how easily the transition from the spray orientation to the bend orientation can be carried out is proportional to a magnitude of the transition voltage. Accordingly, it is considered that the transition voltage applied to the common electrode (COM) is preferably a higher voltage. However, if the transition voltage is caused to be higher for the reason described above, the warp of the equipotential line would become larger, thereby causing the liquid crystal molecules 52 to be twisted more greatly. It follows that the reverse tilt (the liquid crystal molecules 52 tilt up in a direction opposite to the target direction) is likely to be generated.

Condition 2: Lateral Electric Field When Transition Voltage is Turned Off

Next, the following description deals with the lateral electric field when the transition voltage is turned off.

The TFT liquid crystal display device (active matrix liquid crystal display device), in general, is subjected to line inversion driving or dot inversion driving.

Therefore, as indicated by a period of "normal driving" in FIG. 6, voltages which are different to each other are applied to adjacent pixel electrodes 17 between which the gate bus line 32 provided. As a result, the lateral electric field is generated between the adjacent pixel electrodes 17. Further, an alternating-current (AC) voltage is applied to the storage capacitor electrode (Cs) throughout the period of the spray-bend transition, and also throughout the period of the subsequent normal driving.

Figure 8:
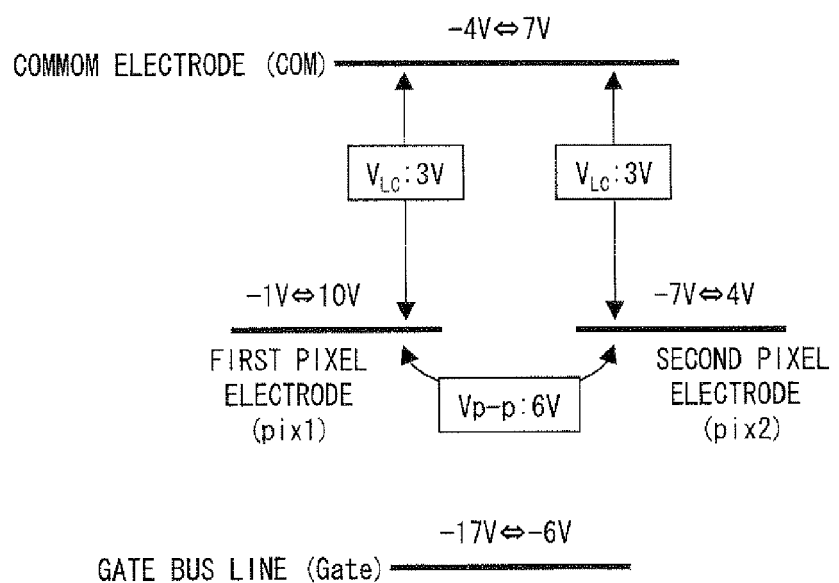
FIG. 8 is a view illustrating an electric potential and a lateral electric field for each electrode during white display (normal display), showing a conventional technique.

Because of this, in an example illustrated in FIG. 8, for example, while the white display is carried out, an electric potential difference ($V_{p-p}$: $V_{pp}$) of approximately 6V is generated between the adjacent pixel electrodes between which the gate bus line is provided. Here, FIG. 8 is a view illustrating an electric potential of each electrode and a lateral electric field, while the white display is carried out.

Figure 9:
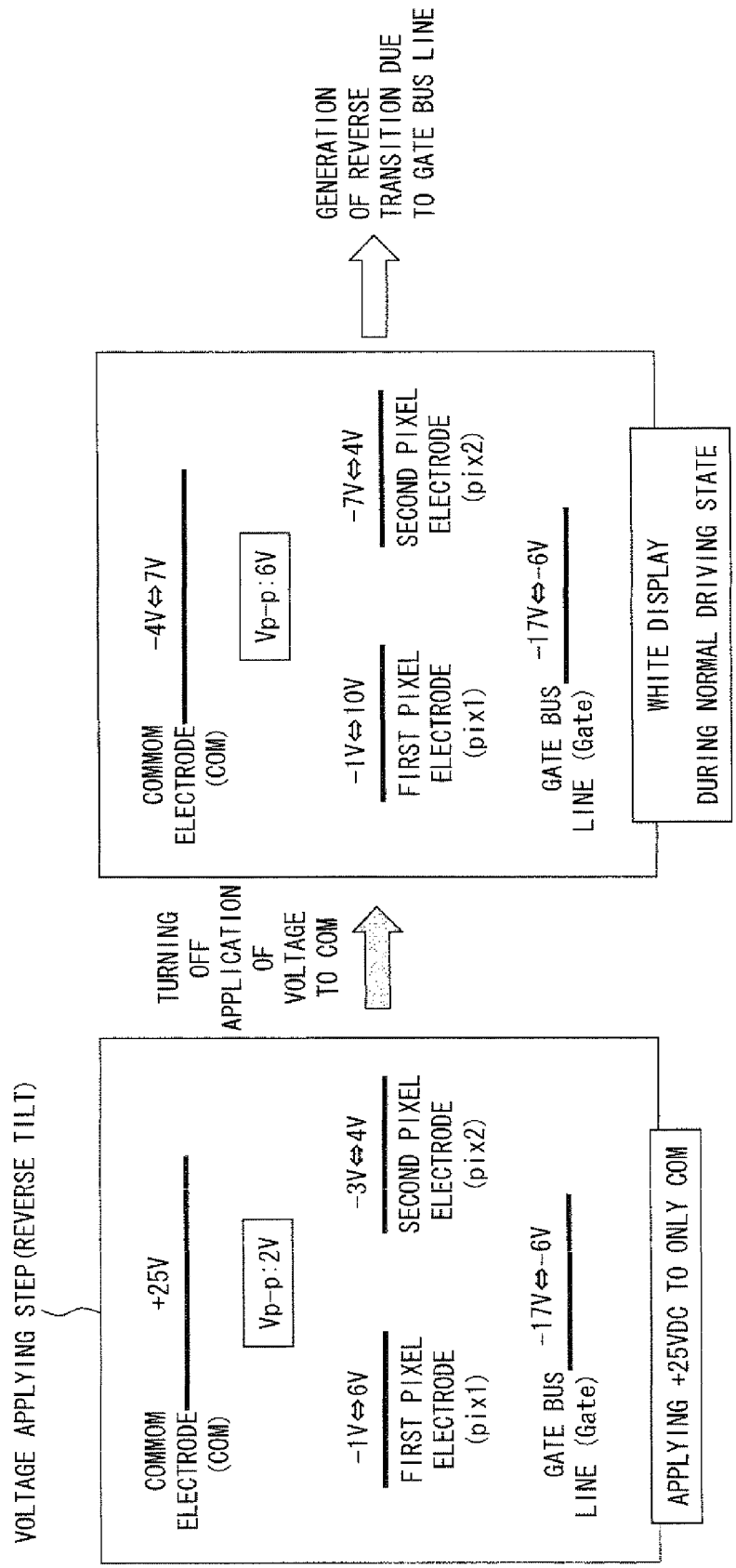
FIG. 9 is a view illustrating a magnitude of a lateral electric field during a spray-bend transition and the magnitude of the lateral electric field during normal driving.

FIG. 9 shows a change in magnitude of the lateral electric field when a bend transition voltage applying period (transition voltage applying step) is changed to the normal driving period, in a case where the electric potentials are the same as these shown in FIG. 8 while the white display is carried out during the normal driving (display in practice). Here, FIG. 9 is a view showing a voltage between the adjacent pixels in a general transition voltage applying step, and a voltage between the adjacent pixels during the period during which the white display is carried out during the normal driving (normal driving period).

As shown in FIG. 9, the difference ($V_{p-p}$) between an electric potential of the first pixel electrode (pix 1) and an electric potential the second pixel electrode (pix 2) is 2V in the transition voltage applying step (period during which the transition voltage is being applied to the common electrode). On the other hand, when the application of the transition voltage to the common electrode (COM) is turned off, the difference ($V_{p-p}$) between the electric potential of the first pixel electrode (pix 1) and the electric potential of the second pixel electrode (pix 2) is increased to 6V while the white display is carried out during the normal driving, as described above.

Thus, in general, when the application of the transition voltage is followed by the normal driving, the electric potential difference between the adjacent pixels becomes greater, and therefore the lateral electric field becomes greater. It follows that the reverse transition is likely to be generated in a case where the reverse tilt remains.

As described above, in the conventional driving method, (i) a high voltage (transition voltage) is applied to the common electrode 27 to cause the transition from the spray orientation to the bend orientation, and then (ii) after the transition is completed, the transition voltage is turned off instantly (within a significantly short period) so as to switch over the application of the transition voltage to the normal driving. Accordingly, in the conventional driving method, there is a case where both the Condition 1 (remaining reverse tilt) and the Condition 2 (lateral electric field when the transition voltage is turned off) are satisfied.

In other words, since the driving state is rapidly changed from State [1] where there is the reverse tilt (the transition voltage applying period) into State [2] where the lateral electric field is large (the normal driving period), the reverse transition is likely to occur.

(Driving of the Present Embodiment)

As compared with the conventional driving, in the present embodiment, a voltage is applied so as not to satisfy the conditions causing the generation of the reverse transition, that is, the conditions where the driving state is rapidly changed from the state where the reverse tilt is generated while the transition voltage is applied, to the state where the lateral electric field is large. In other words, in order to prevent the reverse transition, at least one of the Conditions 1 and 2 described above is not satisfied in the driving of the present embodiment. Specifically, in the driving of the present embodiment, the lateral electric field is suppressed between the pixel electrodes between which the gate bus line is provided, in the inversion driving such as the line inversion driving or the dot inversion driving, so as to reduce the lateral electric field immediately after the transition voltage applied to the common electrode is turned off. Therefore, the Condition 2 among the conditions described above is not satisfied so that the reverse transition, which is generated above the gate bus line when the switchover to the normal display is carried out, is suppressed. The following description explains this with reference to drawings.

That is, first, a voltage of some or tens of Volts (+25VDC, for example) is applied to the common electrode (COM) as the transition voltage, so as to carry out the transition from the spray orientation to the bend orientation over the entire liquid crystal display panel (see "transition voltage (the present embodiment)" of FIG. 6).

During the transition, an alternating-current voltage is applied to the storage capacitor electrode (Cs) in the same manner as in the normal driving period.

Next, after the transition from the spray orientation to the bend orientation is completed over the entire liquid crystal display panel, the application of the transition voltage to the common electrode is stopped.

In the present embodiment, when the application of the transition voltage is stopped, the voltage applied to the storage capacitor electrode (Cs) is switched over from the alternating-current voltage to the direct-current voltage (a storage capacitor electrode voltage has an amplitude of 0).

Then, the transition voltage applied to the common electrode is turned off so as to be followed by the normal driving. After that, the direct-current voltage (DC) stopped to be applied to the storage capacitor electrode, so as to carry out the normal display.

In FIG. 6, the direct-current voltage (DC) applied to the storage capacitor electrode is +25V. However, this is merely an example, and the electric potential is not limited to +25V. Further, in the present embodiment, the voltage applied to the storage capacitor electrode is a direct-current voltage (DC). However, this is merely an example, and the voltage is not limited to the direct-current voltage. The voltage is preferably the one having an amplitude of 0 (direct-current voltage), but may be a signal having a small amplitude, for example.

As described above, in the driving method of the present embodiment, when the application of the transition voltage to the common electrode is turned off (the transition voltage application off time), a direct-current voltage (DC) or a voltage having a small amplitude is applied to the storage capacitor electrode.

In this driving method, when the application of the transition voltage to the common electrode is turned off, the voltage having a small amplitude or the like is applied to the storage capacitor electrode. Therefore, even if the reverse tilt remains when the application of the transition voltage is turned off, it is possible to reduce the lateral electric field immediately after the transition voltage is turned off. In other words, the lateral electric field immediately after the transition voltage is turned off is reduced so as not to satisfy the Condition 2.

Therefore, it becomes possible to (i) maintain the bend orientation without inducing the spray orientation, and simultaneously (ii) suppress the generation of the reverse transition.

Further, the amplitude of the voltage applied to the storage capacitor electrode is small, so that the amplitude of the voltage applied to the pixel electrode can be reduced. As a result, it becomes possible to increase the voltage ($V_{LC}$) between the common electrode and the pixel electrode with respect to the voltage ($V_{pp}$) between the pixel electrodes. That is, it is possible to cause the vertical electric field to be greater than the lateral electric field. The following description deals with this with reference to drawings.

(Relationship Between $V_{pp}$ and $V_{LC}$ (Conventional Technique))

As described above with reference to FIGS. 8 and 9, in the conventional method of applying the transition voltage, the voltage ($V_{pp}$) between the pixel electrodes becomes greater than the voltage ($V_{LC}$) between the common electrode and the pixel electrode as the spray-bend transition period is changed to the normal driving period.

Figure 10:
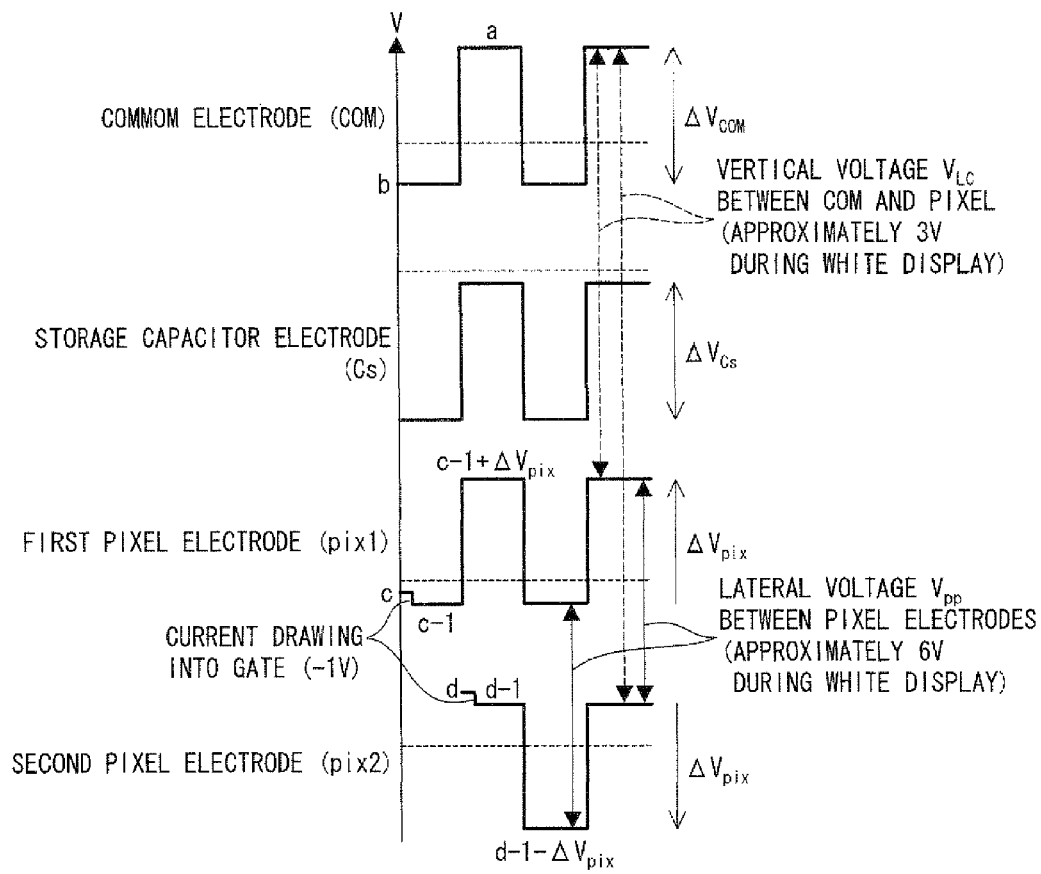
FIG. 10 is a view illustrating a voltage arrangement of a liquid crystal display device.

The following description deals with this more specifically with reference to FIG. 10. FIG. 10 is a view schematically illustrating a voltage arrangement of a liquid crystal display device in the conventional technique. Specifically, FIG. 10 illustrates, during the normal display by the line inversion driving, a relationship between (i) the voltage applied to the common electrode (COM), (ii) the voltage applied to the storage capacitor electrode (Cs), (iii) the electric potential of the first pixel electrode (pix 1), and (iv) the electric potential of the second pixel electrode (pix 2).

As illustrated in FIG. 10, the magnitude of the lateral electric field $V_{pp}$ (the voltage between the pixel electrodes) between the adjacent pixel electrodes depends on the magnitude of a voltage fluctuation ($\Delta V_{pix}$) of the pixel.

The magnitude of the voltage fluctuation ($\Delta V_{pix}$) of the pixel depends on a sum of a voltage fluctuation ($\Delta V_{pix}^{COM}$) of the pixel due to a voltage fluctuation of the common electrode, and a voltage fluctuation ($\Delta V_{pix}^{Cs}$) of the pixel due to a voltage fluctuation of the storage capacitor electrode.

Further, the voltage fluctuation ($\Delta V_{pix}^{COM}$) of the pixel due to the voltage fluctuation of the common electrode, and the voltage fluctuation ($\Delta V_{pix}^{Cs}$) of the pixel due to the voltage fluctuation of the storage capacitor electrode, depend on the voltage fluctuation ($\Delta V_{COM}$) of the common electrode and the voltage fluctuation ($\Delta V_{Cs}$) of the storage capacitor electrode, respectively.

Generally, in a case where the vertical voltage $V_{LC}$ (the voltage between the common electrode and the pixel electrode) applied between the common electrode and the pixel is set to be approximately 3V for the white display, the lateral electric field $V_{pp}$ (the voltage between the pixel electrodes) between the adjacent pixel electrodes becomes approximately 6V on the basis of the relationship described above, as shown in FIG. 10. That is, the voltage ($V_{pp}$) between the pixel electrodes becomes greater than the voltage ($V_{LC}$) between the common electrode and the pixel electrode.

It follows that the spray orientation is induced, thereby easily generating the reverse transition, as described above.

Note that "a" and "b" of FIG. 10 are, respectively, a maximum value and a minimum value in the voltage fluctuation ($\Delta V_{COM}$) of the common electrode (COM). Further, "c" is a minimum value in the voltage fluctuation $\Delta V_{pix}$ of the first pixel electrode (pix 1) in a case where current drawing into the gate is not considered. Furthermore, "d" is a maximum value in the voltage fluctuation $\Delta V_{pix}$ of the second pixel electrode (pix 2) in a case where the current drawing into the gate is not considered.

(Relationship Between $V_{pp}$ and $V_{LC}$ (Present Embodiment))

The generation of the reverse transition can be suppressed by creating a state where the voltage between the pixel electrodes ($V_{pp}$) becomes smaller than the voltage ($V_{LC}$) between the common electrode and the pixel electrode within a period for changing the state where a high voltage is applied to the common electrode to the normal driving state.

Specifically, the voltage amplitude of the voltage applied to the storage capacitor electrode may be reduced when the high voltage, which is the transition voltage applied to the common electrode, is turned off.

Figure 11:
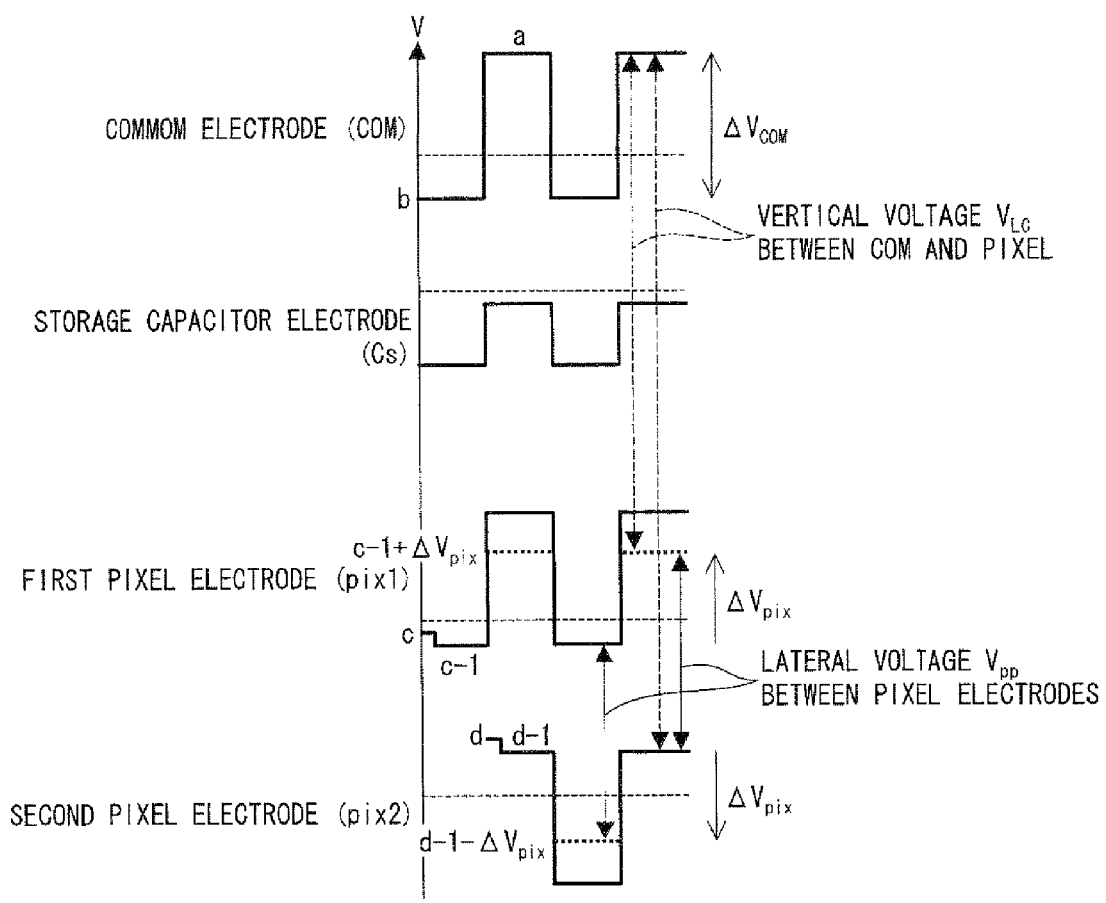
FIG. 11 is a view illustrating a voltage arrangement of a liquid crystal display device, showing the present embodiment.

The following description explains how this method is carried out, with reference to FIG. 11. In the same manner as FIG. 10, FIG. 11 illustrates, during the normal display by the line inversion driving, the relationship between (i) the voltage applied to the common electrode (COM), (ii) the voltage applied to the storage capacitor electrode (Cs), (iii) the electric potential of the first pixel electrode (pix 1), and (iv) the electric potential of the second pixel electrode (pix 2). However, FIG. 10 illustrates the conventional technique, whereas FIG. 11 illustrates the present embodiment.

As illustrated in FIG. 11, in the present embodiment, the voltage fluctuation ($\Delta V_{Cs}$) of the storage capacitor electrode is reduced so that the voltage ($V_{pp}$) between the pixel electrodes is reduced, as being compared with the conventional technique.

As a result of the reduction in the voltage ($V_{pp}$) between the pixel electrodes, the lateral electric field has less influence, thereby hardly causing the induction of the spray orientation and the generation of the reverse transition from the bend orientation to the spray orientation.

(Condition for Satisfying "$V_{LC} > V_{pp}$")

As described above, a value of the voltage ($V_{pp}$) between the pixel electrodes can be suppressed by reducing the voltage fluctuation ($\Delta V_{Cs}$) of the storage capacitor electrode.

Further, in a case where an inequality of "$V_{LC} > V_{pp}$" is satisfied, the vertical electric field becomes greater than the lateral electric field. This causes the lateral electric field to have less influence, so that the spray orientation is hardly induced and the reverse transition from the bend orientation to the spray orientation is hardly generated.

The $V_{LC}$ and $V_{pp}$ are determined by a, b, c, d, $\Delta V_{pix}$, and the like, each of which is shown in FIG. 10.

Further, the $\Delta V_{pix}$ is determined by (i) a ratio of the liquid crystal capacitor $C_{LC}$ between the common electrode and the pixel electrode to the storage capacitor $C_{Cs}$ between the pixel electrode and the storage capacitor electrode, (ii) the voltage amplitude ($\Delta V_{COM}$) of the common electrode, (iii) the voltage amplitude ($\Delta V_{Cs}$) of the storage capacitor electrode, and (iv) the like.

The inequality of "$V_{LC} > V_{pp}$" can be satisfied by appropriately determining each of the values described above.

Figure 12:
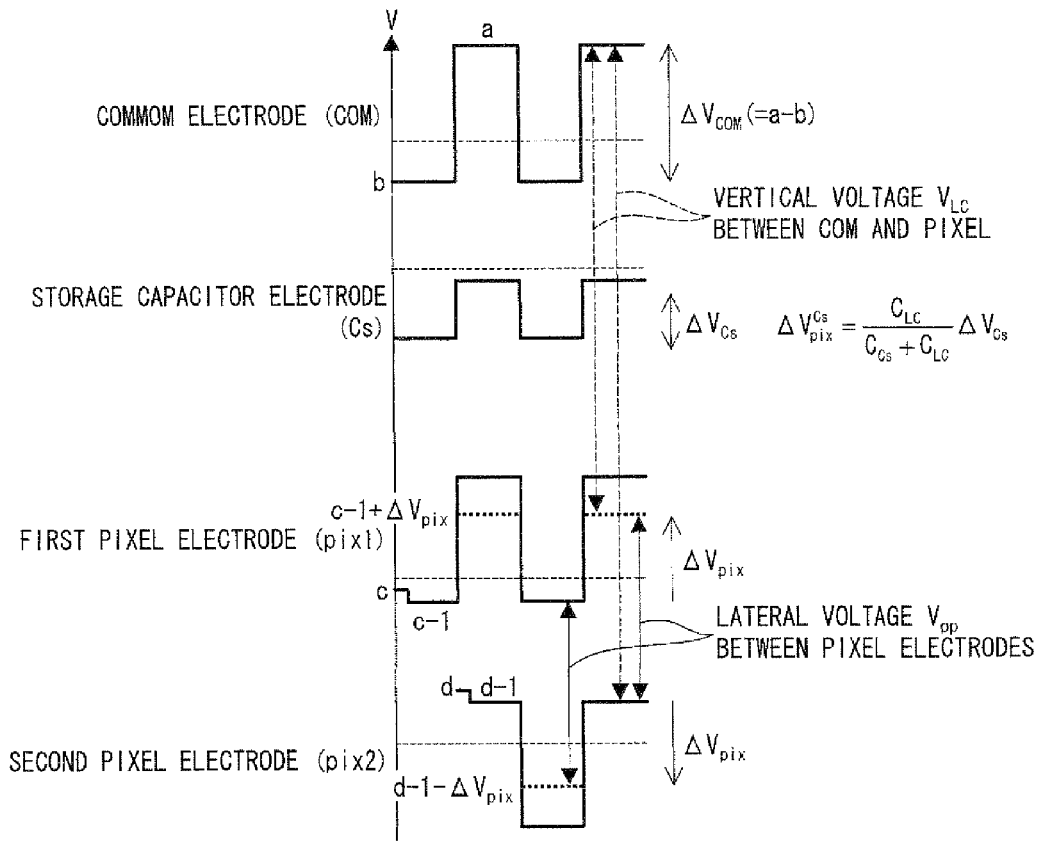
FIG. 12 is a view illustrating a relationship between electric potentials of pixel electrodes.
Figure 13:
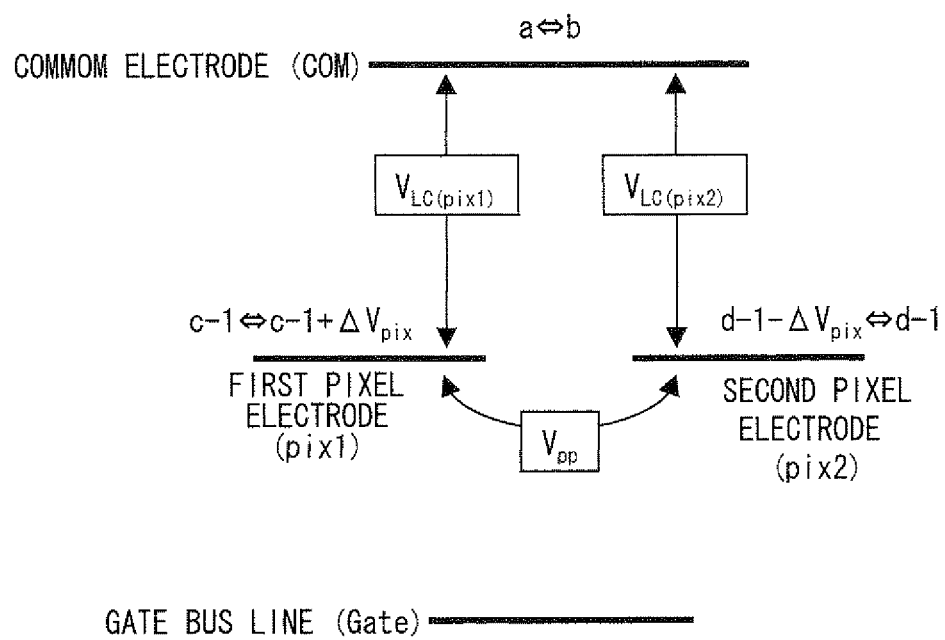
FIG. 13 is a view illustrating the relationship between the electric potentials of the pixel electrodes in accordance with electric potentials of the common electrode.

The following description explains the condition for satisfying the inequality of "$V_{LC} > V_{pp}$", with reference to FIG. 12, and FIG. 13, which is a view illustrating electric potentials of each pixel electrode at the voltage values "a" and "b" described above.

($V_{LC}$)

In a case where an alternating-current signal is applied to the common electrode (COM), the vertical voltage (i.e. the voltage ($V_{LC}$) between the common electrode and pixel electrode) varies in accordance with a value ("a" or "b") of the alternating-current signal, as illustrated in FIG. 12.

In other words, as illustrated in FIGS. 12 and 13, in a case where the electric potential of the common electrode is "a", as to the two pixels adjacent to each other, (i) a vertical voltage $V_{LC(pix1)}$ of the first pixel electrode (pix 1) 17*a* is "a−c+1−$\Delta V_{pix}$", and (ii) a vertical voltage $V_{LC(pix2)}$ of the second pixel electrode (pix 2) 17*b* is "a−d+1".

Further, in a case where the electric potential of the common electrode is "b", the vertical voltage $V_{LC(pix1)}$ of the first pixel electrode (pix 1) 17*a* is "b−c+1", and the vertical voltage $V_{LC(pix2)}$ of the second pixel electrode (pix 2) 17*b* is "b−d+1+$\Delta V_{pix}$".

($V_{pp}$)

Next, the following description deals with the lateral voltage (i.e. the voltage ($V_{pp}$) between the pixel electrodes). As illustrated in FIG. 12, the voltage ($V_{pp}$) between the pixel electrodes in accordance with the present embodiment can be represented by "c−d+$\Delta V_{pix}$".

($V_{LC} - V_{pp}$)

The following shows the condition for satisfying the inequality of "$V_{LC} > V_{pp}$" (i.e. the condition under which the "$V_{LC} - V_{pp}$" becomes positive) on the basis of the values of $V_{LC}$ and $V_{pp}$ described above. As to the first pixel electrode (pix 1) 17*a*, in a case where the electric potential of the common electrode is "a", the condition is "|a−c+1−$\Delta V_{pix}$|>|c−d+$\Delta V_{pix}$|", and in a case where the electric potential of the common electrode is "b", the condition is "|b−c+1|>|c−d+$\Delta V_{pix}$|". On the other hand, as to the second pixel electrode (pix 2) 17*b*, in the case where the electric potential of the common electrode is "a", the condition is "|a−d+1|>|c−d+$\Delta V_{pix}$|", and in the case where the electric potential of the common electrode is "b", the condition is "|b−d+1+$\Delta V_{pix}$|>|c−d+$\Delta V_{pix}$|".

When one of the conditions described above are satisfied, the inequality of "$V_{LC} > V_{pp}$" is satisfied. It follows that the lateral electric field has less influence, thereby hardly causing the induction of the spray orientation and the reverse transition from the bend orientation to the spray orientation.

Embodiment 2

Another embodiment of the present invention is described below with reference to FIG. 14. Arrangements other than the arrangement described in the present embodiment are the same as in Embodiment 1. Further, members having the same functions as the members illustrated in the drawings used in Embodiment 1 have the same signs, and explanations for them are omitted for the sake of simple explanation.

A method of the present embodiment, for driving a liquid crystal display device, is different from the method of the Embodiment 1, for driving the liquid crystal display device, in that timing to reduce the voltage amplitude of the storage capacitor electrode is before timing to turn off the transition voltage applied to the common electrode.

That is, in Embodiment 1, when the driving voltage applied to the common electrode is caused back to be the normal driving by turning off the transition voltage applied to the common electrode, the voltage amplitude of the storage capacitor electrode is reduced so as to satisfy the inequality of "$V_{LC} > V_{pp}$". However, in the present embodiment, the timing to reduce the voltage amplitude of the storage capacitor electrode is before the timing to turning off the transition voltage applied to the common electrode.

Figure 14:
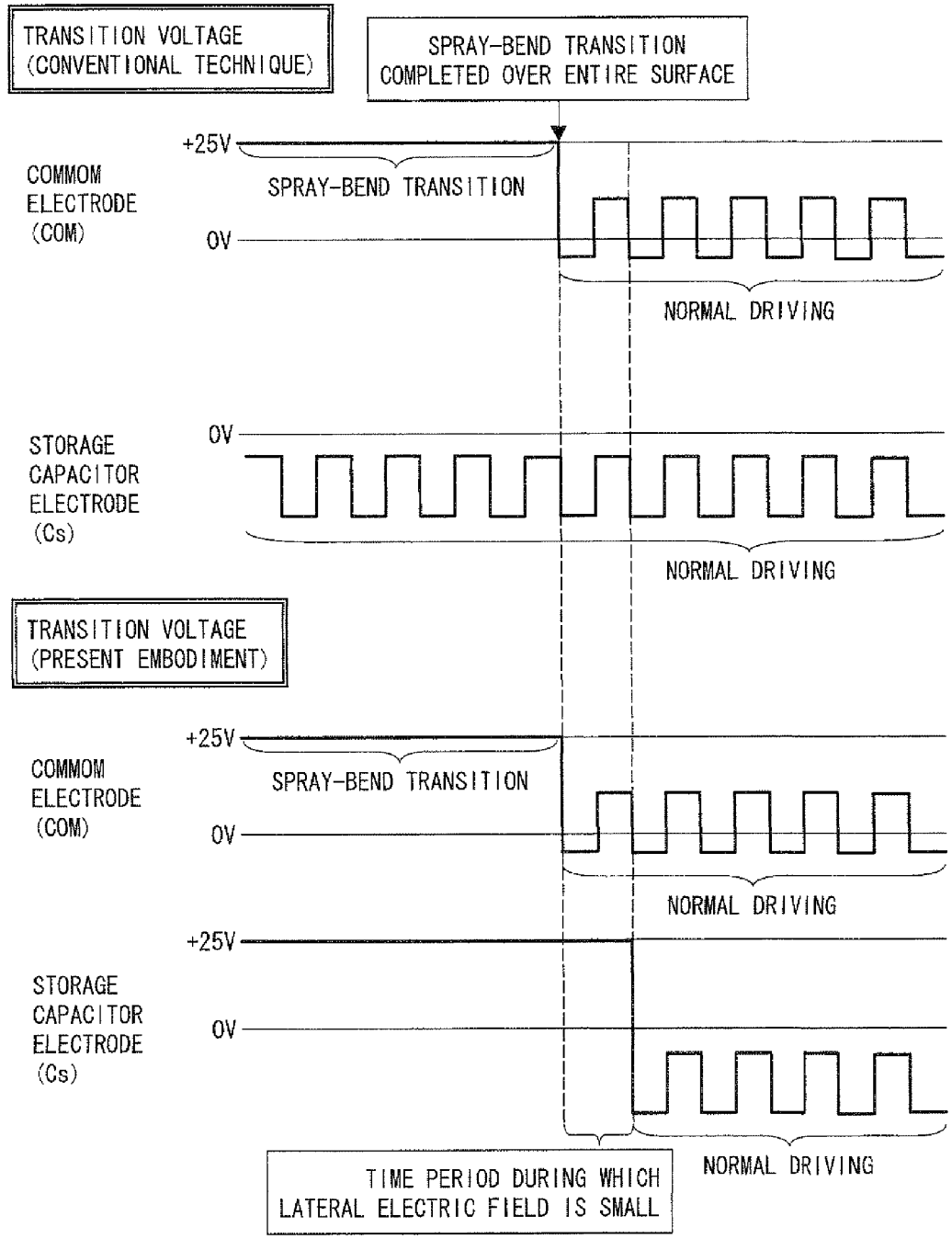
FIG. 14 is a view illustrating a flow of a voltage applied to each of the common electrode and the storage capacitor electrode.

The following description explains this with reference to FIG. 14, which is a view illustrating a flow of the voltages applied to the common electrode and the storage capacitor electrode.

That is, as illustrated in FIG. 14, first, a voltage of +25VDC (direct-current) is applied to the common electrode (COM) and the storage capacitor electrode (Cs) as the transition voltage.

This allows the spray-bend transition to proceed. After the spray-bend transition is completed over an entire liquid crystal layer, the applied voltage is switched over to the normal driving in the order from the common electrode (COM) to the storage capacitor electrode (Cs).

Here, the DC (direct-current) is applied to the storage capacitor electrode (Cs). This is because, the electric potential of the storage capacitor electrode (Cs) generally varies, but by applying the DC to the storage capacitor electrode (Cs), it becomes possible to suppress a fluctuation of an electric potential of a pixel electrode due to the fluctuation of the electric potential of the storage capacitor electrode (Cs). As a result, the lateral electric field can be reduced.

The voltage applied to the common electrode (COM) and the storage capacitor electrode (Cs) is not limited to the one illustrated in FIG. 14. That is, it is necessary to cause the lateral electric field to be small immediately after the transition voltage applied to the common electrode (COM) is turned off, so that the important point of the present embodiment is to cause the applied voltage back to be the normal driving in the order from the common electrode (COM) to the storage capacitor electrode (Cs). Therefore, details of the driving condition, such as an applied voltage, can be determined as appropriate.

Embodiment 3

Still another embodiment of the present invention is described below with reference to FIGS. 15 and 16. Arrangements other than the arrangement explained in the present embodiment are the same as in each of the embodiments described above. Further, members having the same functions as the members illustrated in the drawings used in each of the embodiments described above have the same signs, and explanations of them are omitted for the sake of simple explanation.

A method of the present embodiment, for driving a liquid crystal display device, is different from a method of each of the embodiments described above, for driving a liquid crystal display device, in that when the applied voltage is caused back to be the normal driving by turning off the transition voltage applied to a common electrode, all gate bus lines are turned on. This method can cause a lateral voltage $V_{pp}$ between pixel electrodes between which the gate bus line is provided to be 0, so that it becomes possible to suppress the generation of the reverse transition more successfully. The following description deals with this method.

Generally, the gate bus lines are selected and turned on sequentially during gate inversion driving. When a gate bus line is selected, the adjacent pixel electrodes between which a gate bus line is provided are supplied with, respectively, voltages which are different from each other on polarity. This causes the lateral electric field to be generated between the adjacent pixel electrodes.

On the other hand, as described above, if all of the gates (all gate bus lines) are turned on, the same voltage is applied from the data bus lines (source bus lines) to all of the pixels (pixel electrodes). This causes the lateral voltage $V_{pp}$ to be 0. The following description deals with this more specifically, with reference to drawings.

In general, during line inversion driving such as gate inversion driving, gates are turned on sequentially so that the polarity of the voltage signals written to the pixel electrodes differs per line. For example, in a case where an entire screen has a single pattern, every other line is supplied with the same voltage, but adjacent pixel electrodes are supplied with voltages which are different from each other in polarity. For this reason, the lateral electric field is inevitably generated between adjacent pixels between which the gate bus line is provided.

On the other hand, in the driving method of the present embodiment, it becomes possible to write the same voltage to all of the pixel electrodes by turning on all of the gate bus lines simultaneously. As a result, the lateral electric field is not generated as illustrated in FIG. 16, which shows the lateral electric field when all of the gate bus lines are turned on simultaneously. In a case of plane driving (common electrode (COM), storage capacitor electrode (Cs): an arbitral DC voltage is applied, gate: all of the gates are turned on, source: grounded (GND)), the reverse transition due to the gate bus line is not generated.

Specifically, the timing to turn on all of the gates is not particularly limited as long as all of the gates are in the on-state when the transition voltage applied to the common electrode is turned off.

Figure 15:
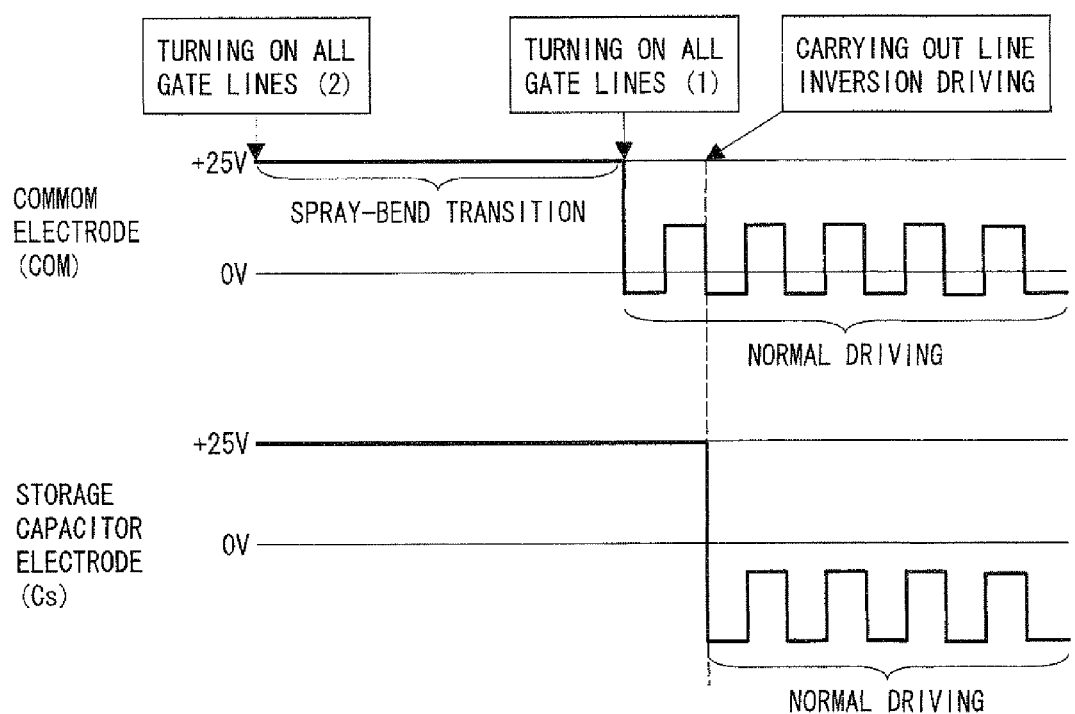
FIG. 15 is a view illustrating the voltage applied to the common electrode, and a switching condition of gates.
Figure 16:
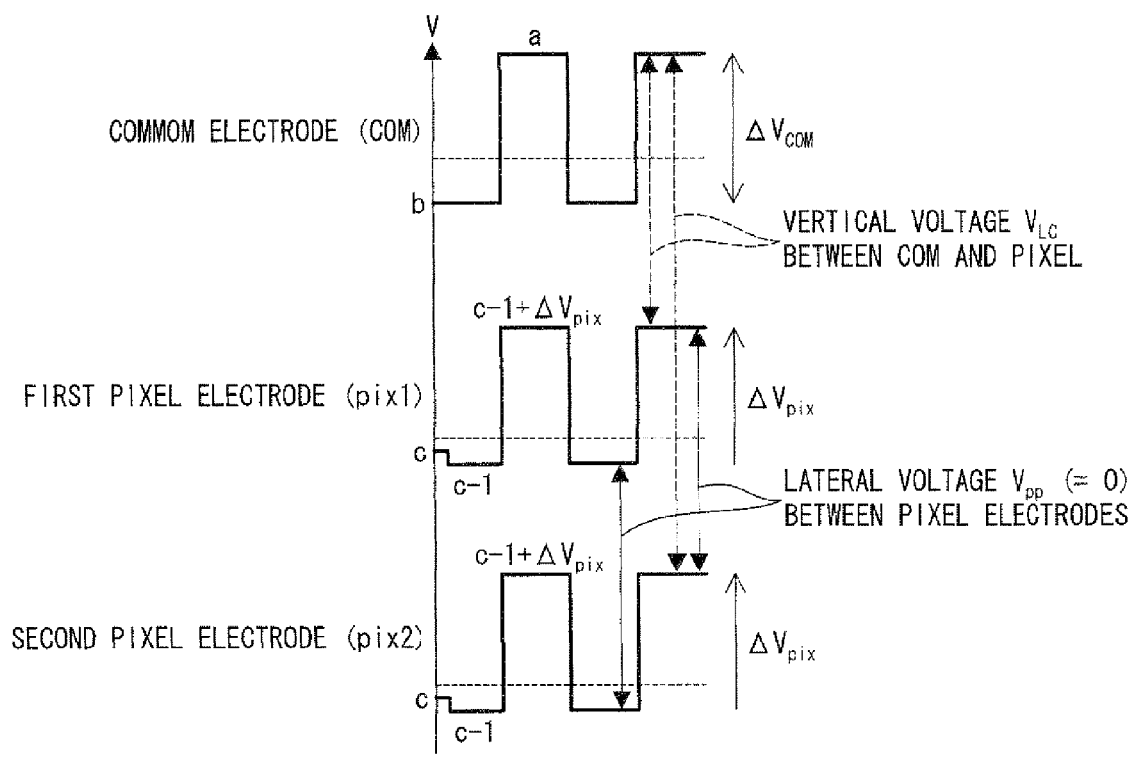
Figure 17:
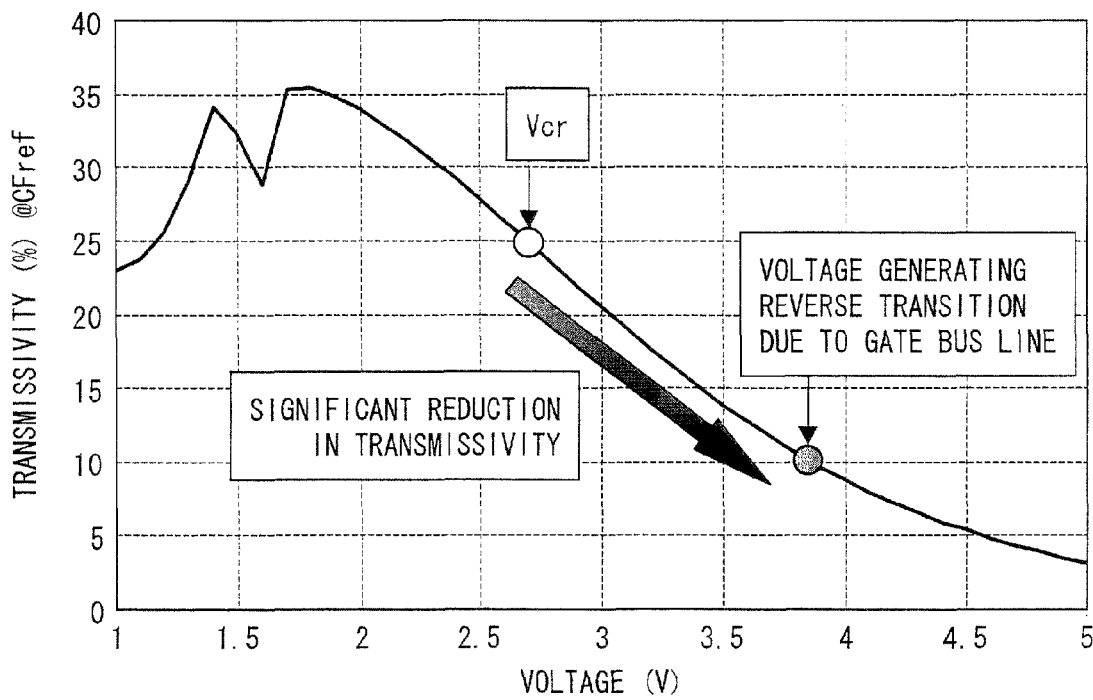
FIG. 17 is a view showing a relationship between an applied voltage and a transmissivity in an OCB mode liquid crystal display device (normally-white mode).

The following description deals with an example of the driving method of the present embodiment with reference to FIG. 15, which illustrates the voltage applied to the common electrode (COM) and a switching condition of the gates. As illustrated in FIG. 15, first, a voltage of +25VDC is applied to the common electrode (COM) as the transition voltage. Then, when the spray-bend transition is completed over all of the pixels, and the application of the transition voltage to the common electrode is turned off, all of the gates are turned on (see "Turning on all gates (1)" of FIG. 15). After the voltage applied to the common electrode is switched over to the voltage applied during the normal driving period, the on-state of all of the gates is cancelled, and the line inversion driving is started.

Here, as to the common electrode and the gates, it is important to cause the applied voltage back to be the normal driving (line inversion driving) in the order that (i) the voltage applied to the common electrode is caused to be back to the normal driving state (from a direct-current voltage to an alternating-current voltage), and then (ii) the gates are caused back to be the normal driving state (from the on-state to the line inversion driving state). This can successfully suppress the generation of the lateral electric field when the transition voltage is turned off.

In other words, if the gates are caused back to be the line inversion driving state before the transition voltage applied to the common electrode is turned off, a state where there is reverse tilt is changed into a state where the lateral electric field is large. This order is likely generates the reverse transition. Therefore, in order to eliminate the lateral electric field immediately after the transition voltage applied to the common electrode (COM) is turned off, it is important to cause the driving state back to be the normal driving state in the order from the common electrode (COM) to the gates.

(Electric Potential of Storage Capacitor Electrode)

In the driving method of the present embodiment, the voltage applied to the storage capacitor electrode (Cs) is not particularly limited.

For example, as the voltage applied to the storage capacitor electrode, the DC may be applied to the storage capacitor electrode at the same time that the application of the transition voltage to the common electrode is started, as illustrated in FIG. 15. By applying the DC to the storage capacitor electrode as described above, it becomes possible to cause the driving state to be substantially close to the plane driving state. Thereby, it becomes possible to suppress the generation of the lateral electric field more successfully.

Embodiment 4

Yet still another embodiment of the present invention is described below with reference to FIG. 15. Arrangements other than the arrangement explained in the present embodiment are the same as in each of the embodiments described above. Further, the members having the same functions as the members illustrated in the drawings used in each of the embodiments described above have the same signs, and explanations of them are omitted for the sake of simple explanation.

A method of the present embodiment, for driving a liquid crystal display device is different from the method of Embodiment 3, for driving a liquid crystal display device, in that all of the gate bus lines are turned on before the transition voltage is applied to the common electrode. The following description deals with the method.

The following description deals with an example of the driving method of the present embodiment with reference to FIG. 15, which is a view illustrating a voltage applied to the common electrode (COM) and a switching condition of the gates.

In the driving method of the present embodiment, all of the gates are turned on (see "Turning on all gates (2)" of FIG. 15) at the same time that a voltage of +25VDC is started to be applied to the common electrode (COM) as the transition voltage. After (i) the spray-bend transition is completed over all of the pixels, and (ii) the transition voltage applied to the common electrode is turned off so as to cause the voltage applied to the common electrode to be the voltage applied during the normal driving period, the on-state of all of the gates is cancelled, and the line inversion driving is started.

As compared with Embodiment 3 where all of the gate bus lines are turned on when the transition voltage applied to the common electrode is turned off, in the present embodiment, all of the gate bus lines are turned on before the transition voltage applied to the common electrode is turned off. By turning on all of the gate bus lines during the period during which the transition voltage is being applied to the common electrode, it becomes possible to reduce a period necessary for the spray-bend transition. The following description explains reasons for this.

A first reason is described below. Generally, during the line inversion driving, the lateral electric field is generated between the adjacent pixel electrodes between which the gate bus line provided. The generation of the lateral electric field between the pixel electrodes (i) induces the spray orientation more greatly, and (ii) causes the bend orientation to hardly pass over the gate bus line. As a result, it takes more time to complete the spray-bend transition.

On the other hand, if the line inversion driving is not carried out but all of the gate bus lines are turned on during the period during which the transition voltage is being applied to the common electrode, the lateral electric field is hardly generated between the pixel electrodes. Therefore, the bend orientation is likely to spread out over adjacent pixels, so that it takes less time to complete the spray-bend transition.

Next, the second reason is explained below. As the spray-bend transition spreads out in a pixel, in other words, as a region subjected to the bend orientation spreads out in the pixel, the voltage ($V_{LC}$) between the common electrode and the pixel electrode decreases in accordance with the spread.

That is, an electric capacitor C of the liquid crystal layer 50 can be represented by the following Formula (1).

$$C = \epsilon \cdot S/d \quad (1)$$

Note that "$\epsilon$" is a dielectric constant of the liquid crystal molecule 52, "S" is an area of the pixel electrode 17, and "d" is a thickness of the liquid crystal layer 50.

Here, the dielectric constant "$\epsilon$" of the liquid crystal molecule 52 has an anisotropy. If the liquid crystal molecule 52 is p-type liquid crystal, the dielectric constant "$\epsilon$" becomes greater in the bend orientation state than in the spray orientation state. If the dielectric constant "$\epsilon$" becomes large, the electric capacitor C of the liquid crystal layer 50 would become large as shown in the aforementioned Formula (1).

Next, the following description explains a relationship between the electric capacitor C and the voltage applied to the liquid crystal layer 50.

The relationship between the electric capacitor C and the voltage applied to the liquid crystal layer 50 can be represented by the following Formula (2).

$$Q = C \cdot V \quad (2)$$

Note that "Q" is an electric charge (electric charge of the pixel electrode 17), and "V" is a voltage (voltage applied to the liquid crystal layer 50).

In the TFT driving, during a period during which the gates are in the off-state, the electric charge of the pixel electrode 17 is stored, so that the electric charge Q of the aforementioned Formula (2) becomes constant. Accordingly, the voltage V applied to the liquid crystal layer 50 varies depending on a change in the electric capacitor C.

As described above, as the orientation of the liquid crystal molecules 52 is changed to from the spray orientation to the bend orientation, the electric capacitor C of the liquid crystal 50 becomes large (see Formula (1)). Along with this, the voltage applied to the liquid crystal layer 50 (i.e. the voltage ($V_{LC}$) between the common electrode and the pixel electrode) decreases on the basis of the aforementioned Formula (2).

In the TFT driving, there are a time period during which the electric charge is charged in the pixel electrode, and another period during which the electric charge thus charged is maintained. The charging of the electric charge is carried out per 16.67 msec in a case where the writing is carried out at 60 Hz. That is, the time period between each of the writings is 16.67 msec.

Therefore, if the bend orientation spreads out in the pixel within 16.68 msec, the voltage applied to the liquid crystal (i.e. the voltage ($V_{LC}$) between the common electrode and the pixel electrode) decreases until the next writing is carried out. As a result, the speed of the spread of the bend orientation in the pixel becomes slow.

On the other hand, if all of the gate bus lines are turned on, it becomes possible to create, over all of the pixels, a state where the charging is continuously carried out with respect to the pixel electrode. For this reason, if the orientation is changed to the bend orientation, the voltage applied to the liquid crystal hardly decreases. As a result, it becomes possible to reduce the time period necessary for the spray-bend transition.

In other words, if the transition voltage is applied in the order that (i) all of the gates are turned on, and then (ii) the transition voltage is applied to the common electrode (COM), it becomes possible to carry out the spray-bend transition over all of the pixels more quickly as compared with a case where the transition voltage is applied in the order that (i) the transition voltage is applied to the common electrode (COM), and then (ii) all of the gates are turned on.

In the present invention, the application of the voltage to the liquid crystal layer or the like is carried out mainly by the common electrode driving power source 68, the display control circuit 60, the gate driver 62, the source driver 64, and the like.

The present invention is not limited to the description of the embodiments above, but may be altered by a skilled person within the scope of the claims. An embodiment based on a proper combination of technical means disclosed in different embodiments is encompassed in the technical scope of the present invention.

INDUSTRIAL APPLICABILITY

According to a liquid crystal display device of the present invention, generation of reverse transition and a reduction in display quality are suppressed in an OCB liquid crystal display device. Therefore, the liquid crystal display device of the present invention is suitably used to display high-quality moving images.

The invention claimed is:

1. A method of driving an OCB liquid crystal display device comprising:
a main substrate on which a plurality of pixel electrodes are provided in a grid pattern;
a counter substrate on which a common electrode is provided;
a liquid crystal layer which is sandwiched between the main substrate and the counter substrate; and
a storage capacitor electrode provided on the main substrate,
a voltage to be applied to the liquid crystal layer varying in accordance with an electric potential of the common electrode and an electric potential of the storage capacitor electrode,
liquid crystal molecules of the liquid crystal layer having a spray orientation while no voltage is applied to the liquid crystal layer, and having a transition from the spray orientation to a bend orientation while a transition voltage is being applied to the liquid crystal layer, and
said method comprising:
causing an electric potential difference between any one of the plurality of pixel electrodes and the common electrode to be greater than an electric potential difference between the any one of the plurality pixel electrodes and a pixel electrode adjacent to the any one of the plurality of the pixel electrodes, immediately after the transition voltage is turned off;
applying an alternating-current voltage to the storage capacitor electrode so as to cause the liquid crystal display device to be subjected to inversion driving during image display; and when the application of the transition voltage is stopped, applying to the storage capacitor electrode a voltage which (i) does not cause the liquid crystal molecules to have a transition from the bend orientation to the spray orientation and (ii) has a smaller amplitude than that of the alternating-current voltage applied during the image display; and starting to apply the voltage having the smaller amplitude than that of the alternating-current voltage applied during the image display to the storage capacitor electrode, from before the application of the transition voltage is stopped.

2. The method recited in claim 1, wherein:

when the application of the transition voltage is stopped, the voltage applied to the storage capacitor electrode has an amplitude of 0.

3. The method of claim 2, further comprising:

applying a direct-current voltage to the common electrode so as to perform the application of the transition voltage to the liquid crystal layer;

applying a direct-current voltage to the storage capacitor electrode, wherein the applying of the direct-current voltage is started before the application of the transition voltage is stopped;

when the application of the transition voltage is stopped, applying an alternating-current voltage to the common electrode instead of the direct-current voltage; and after the alternating-current voltage is started to be applied to the common electrode, applying an alternating-current voltage to the storage capacitor electrode instead of the direct-current voltage.

4. The method of claim 1, further comprising:

applying a direct-current voltage to the common electrode so as to perform the application of the transition voltage to the liquid crystal layer;

applying a direct-current voltage to the storage capacitor electrode, wherein the applying of the direct-current voltage is started before the application of the transition voltage is stopped;

when the application of the transition voltage is stopped, applying an alternating-current voltage to the common electrode instead of the direct-current voltage; and after the alternating-current voltage is started to be applied to the common electrode, applying an alternating-current voltage to the storage capacitor electrode instead of the direct-current voltage.

* * * * *